(12) United States Patent
  Das Gupta et al.

(10) Patent No.: US 11,614,739 B2
(45) Date of Patent: Mar. 28, 2023

(54) SYSTEMS AND METHODS FOR HEDGING FOR DIFFERENT GAPS IN AN INTERACTION ZONE

(71) Applicant: Apple Inc., Cupertino, CA (US)

(72) Inventors: Ujjwal Das Gupta, San Francisco, CA (US); Sandip Aine, Sunnyvale, CA (US); Martin Levihn, San Jose, CA (US); Trevor P. Barron, San Jose, CA (US); Jamie R. Lesser, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 164 days.

(21) Appl. No.: 17/018,616

(22) Filed: Sep. 11, 2020

(65) Prior Publication Data

US 2021/0089041 A1    Mar. 25, 2021

Related U.S. Application Data

(60) Provisional application No. 62/905,012, filed on Sep. 24, 2019.

(51) Int. Cl.
  *G05D 1/02*  (2020.01)
  *G05D 1/00*  (2006.01)
  (Continued)

(52) U.S. Cl.
  CPC ..... *G05D 1/0214* (2013.01); *B60W 30/18163* (2013.01); *B60W 60/0011* (2020.02);
  (Continued)

(58) Field of Classification Search
  CPC combination set(s) only.
  See application file for complete search history.

(56) References Cited

U.S. PATENT DOCUMENTS 2,190,123 A    2/1940   Pace
7,095,318 B1   8/2006   Bekhor
(Continued)

FOREIGN PATENT DOCUMENTS

EP           1912157        4/2008
WO      WO 2018/132608      7/2018

OTHER PUBLICATIONS

"Nissan IDS Concept: Nissan's vision for the future of EVs and autonomous driving," Oct. 27, 2015, http://nissannews.com/en-US/nissan/usa/releases/nissan-ids-concept-nissan-s-vision-for-the-future-of-evs-and-autonomous-driving, accessed Sep. 14, 2016.
(Continued)

*Primary Examiner* — Anne Marie Antonucci
*Assistant Examiner* — Amelia Vorce
(74) *Attorney, Agent, or Firm* — Polsinelli PC

(57) ABSTRACT

Implementations described and claimed herein provide systems and methods for controlling an autonomous vehicle. In one implementation, the autonomous vehicle is navigated towards a flow of traffic with a first gap between first and second vehicles and a second gap following the second vehicle. A motion plan for directing the autonomous vehicle into the flow of traffic at an interaction zone is generated based on whether an ability of the autonomous vehicle to enter the interaction zone at the second gap exceeds a confidence threshold. The autonomous vehicle is autonomously navigated into the flow of traffic at the first gap when the confidence threshold is exceeded. The motion plan forgoes navigation of the autonomous vehicle into the flow of traffic at the first and second gaps when the ability of the autonomous vehicle to enter the interaction zone at the second gap does not exceed the confidence threshold.

21 Claims, 14 Drawing Sheets

(51) Int. Cl.
*B60W 30/18* (2012.01)
*B60W 60/00* (2020.01)

(52) U.S. Cl.
CPC ..... *B60W 60/00274* (2020.02); *G05D 1/0088* (2013.01); *G05D 1/0223* (2013.01); *B60W 2554/80* (2020.02); *B60W 2555/60* (2020.02); *B60W 2720/103* (2013.01); *B60W 2720/106* (2013.01); *G05D 2201/0213* (2013.01)

(56) References Cited

U.S. PATENT DOCUMENTS

| | | |
|---|---|---|
| 7,844,394 B2 | 11/2010 | Kim |
| 7,647,180 B2 | 12/2010 | Breed |
| 7,924,146 B2 | 4/2011 | Seder et al. |
| 8,269,652 B2 | 9/2012 | Seder et al. |
| 8,514,100 B2 | 8/2013 | Yamashita |
| 8,788,134 B1 | 7/2014 | Litkouhi et al. |
| 8,849,494 B1 | 9/2014 | Herbach |
| 8,996,224 B1 | 3/2015 | Herbach |
| 9,196,164 B1 | 11/2015 | Urmson et al. |
| 9,336,436 B1 | 5/2016 | Dowdall |
| 9,428,186 B2 | 8/2016 | Breed |
| 9,443,153 B1 | 9/2016 | Gupta et al. |
| 9,475,491 B1 | 10/2016 | Nagasaka et al. |
| 9,535,423 B1 | 1/2017 | Debreczeni |
| 9,654,738 B1 | 5/2017 | Ferguson |
| 9,718,405 B1 | 8/2017 | Englander et al. |
| 9,829,889 B1 | 11/2017 | Kusano et al. |
| 9,849,784 B1 | 12/2017 | Chan |
| 9,870,703 B2 | 1/2018 | MacNeille et al. |
| 9,881,503 B1 | 1/2018 | Goldman-Shenhar et al. |
| 9,884,585 B1 | 2/2018 | Lubbers |
| 9,902,311 B2 | 2/2018 | Sweeney |
| 9,954,252 B2 | 4/2018 | Ogihara et al. |
| 9,994,148 B1 | 6/2018 | Kim |
| 10,053,001 B1 | 8/2018 | Nabbe et al. |
| 10,062,288 B2 | 8/2018 | Litkouhi et al. |
| 10,118,548 B1 | 11/2018 | Fields et al. |
| 10,134,280 B1 | 11/2018 | You |
| 10,196,058 B2 | 2/2019 | Paris et al. |
| 10,261,513 B2 | 4/2019 | Reiley et al. |
| 10,262,528 B2 | 4/2019 | Fields et al. |
| 10,286,913 B2 | 5/2019 | Saigusa et al. |
| 10,317,907 B2 | 6/2019 | Shami |
| 2003/0023370 A1 | 1/2003 | Millington et al. |
| 2003/0147247 A1 | 8/2003 | Koike |
| 2004/0193347 A1 | 9/2004 | Harumoto |
| 2005/0117364 A1 | 6/2005 | Rennick et al. |
| 2007/0277100 A1 | 11/2007 | Sheha et al. |
| 2008/0161986 A1 | 7/2008 | Breed |
| 2009/0069977 A1 | 3/2009 | Markyvech |
| 2010/0082251 A1 | 4/2010 | Kogure |
| 2010/0328055 A1 | 12/2010 | Fong et al. |
| 2011/0046835 A1 | 2/2011 | Taguchi |
| 2011/0090093 A1 | 4/2011 | Grimm et al. |
| 2011/0184617 A1 | 7/2011 | Hegemann et al. |
| 2011/0199199 A1 | 8/2011 | Perkins |
| 2011/0234422 A1 | 9/2011 | Yamashita |
| 2012/0083960 A1 | 4/2012 | Zhu et al. |
| 2012/0242479 A1 | 9/2012 | Ghazarian et al. |
| 2012/0310465 A1 | 12/2012 | Boatright |
| 2013/0265791 A1 | 10/2013 | Dassanayake et al. |
| 2013/0345900 A1 | 12/2013 | Usui |
| 2014/0268353 A1 | 9/2014 | Fujimura et al. |
| 2014/0365126 A1 | 12/2014 | Vulcano et al. |
| 2015/0066284 A1 | 3/2015 | Yopp |
| 2015/0151725 A1 | 6/2015 | Clarke et al. |
| 2015/0183430 A1 | 7/2015 | Schwindt et al. |
| 2015/0332114 A1 | 11/2015 | Springer |
| 2015/0336502 A1 | 11/2015 | Hillis et al. |
| 2016/0003636 A1 | 1/2016 | Ng-Thow-Hing |
| 2016/0040997 A1 | 2/2016 | Otani |
| 2016/0061613 A1 | 3/2016 | Jung et al. |
| 2016/0068099 A1 | 3/2016 | Peterson et al. |
| 2016/0207443 A1 | 7/2016 | Widdowson et al. |
| 2016/0231746 A1 | 8/2016 | Hazelton et al. |
| 2016/0355192 A1 | 12/2016 | James |
| 2016/0375900 A1 | 12/2016 | Laur et al. |
| 2017/0203764 A1* | 7/2017 | Fujiki ................ B60W 10/04 |
| 2017/0217368 A1 | 8/2017 | Lewis |
| 2017/0240096 A1 | 8/2017 | Ross |
| 2017/0240098 A1 | 8/2017 | Sweeney et al. |
| 2017/0243490 A1 | 8/2017 | Leppanen et al. |
| 2017/0270374 A1 | 9/2017 | Myers et al. |
| 2017/0277192 A1 | 9/2017 | Gupta et al. |
| 2018/0072218 A1 | 3/2018 | Sweeney |
| 2018/0170388 A1 | 6/2018 | Shin |
| 2018/0276986 A1 | 9/2018 | Delp |
| 2018/0286232 A1 | 10/2018 | Shau |
| 2018/0329418 A1 | 11/2018 | Baalke et al. |
| 2018/0334089 A1 | 11/2018 | Huang et al. |
| 2018/0339708 A1* | 11/2018 | Geller ................ B60L 3/0015 |
| 2019/0118810 A1 | 4/2019 | Paris et al. |
| 2019/0139415 A1* | 5/2019 | Sakaguchi ........ B60W 60/0015 |
| 2019/0196482 A1 | 6/2019 | Reiley et al. |
| 2019/0265703 A1 | 8/2019 | Hicok et al. |
| 2019/0317506 A1* | 10/2019 | Ishioka ................ B60W 50/14 |
| 2019/0329779 A1* | 10/2019 | D'Sa ..................... G06N 20/20 |
| 2019/0337530 A1* | 11/2019 | Hiramatsu ........... G05D 1/0088 |
| 2019/0382021 A1* | 12/2019 | Niibo ..................... B60W 10/20 |
| 2020/0001779 A1 | 1/2020 | Alexander |
| 2020/0017106 A1 | 1/2020 | Park |
| 2020/0027352 A1* | 1/2020 | Yoo ....................... G06V 20/588 |
| 2020/0079377 A1* | 3/2020 | Yashiro ............. B60W 60/0011 |
| 2020/0114812 A1 | 4/2020 | Imaishi et al. |
| 2020/0114813 A1 | 4/2020 | Lujan et al. |
| 2020/0180641 A1* | 6/2020 | Hashimoto ..... B60W 30/18163 |
| 2020/0279488 A1* | 9/2020 | Shibasaki ............. B60W 30/10 |
| 2021/0074162 A1* | 3/2021 | Jafari Tafti ......... B60W 30/095 |

OTHER PUBLICATIONS

Trivedi et al., Holistic Sensing and Active Displays for Intelligent Diver Support Systems, 2007, IEEE, p. 60-68.
Ng-Thow-Hing et al., User-centered perspectives for automotive augmented realtiy, 2013, IEEE, p. 13-22.
Mueller et al., "Object-related-navigation for mobile robots," 2012, IEEE, p. 603-610.
Wang et al., "Steering behaviors for autonomous vehicles in virtual environments," 2005, IEEE, p. 155-162.
Willemesen et al., "Ribbon networks for modeling navigable paths of autonomous agents in virtual environments," 2006, IEEE, p. 331-342.
Sotelo et al., "Vision-based navigation system for autonomous urban transport vehicles in outdoor environments," 2002, IEEE, p. 52-57.
Waxman et al., "A visual navigation system for autonomous land vehicles," 1987, IEEE, p. 124-141.

* cited by examiner

SYSTEMS AND METHODS FOR HEDGING FOR DIFFERENT GAPS IN AN INTERACTION ZONE

CROSS-REFERENCE TO RELATED APPLICATIONS

The present application claims priority to U.S. Provisional Application Ser. No. 62/905,012, entitled "SYSTEMS AND METHODS FOR HEDGING FOR DIFFERENT GAPS IN AN INTERACTION ZONE," filed on Sep. 24, 2019, which is incorporated by reference herein in its entirety.

FIELD

Aspects of the present disclosure relate to systems and methods for hedging for different gaps in an interaction zone and more particularly to directing an autonomous vehicle into a flow of traffic given an uncertainty in yielding agents at an interaction zone.

BACKGROUND

Navigating a vehicle from a first step to a second step along a route often includes directing the vehicle into a flow of traffic involving multiple vehicles. Entering a flow of traffic generally involves avoiding conflict with other vehicles by directing the vehicle into to a gap between vehicles. Such gaps, however, are predicated on whether a corresponding vehicle will yield to allow the vehicle to enter the flow of traffic, and it may be challenging to determine whether the corresponding vehicle intends to yield. These challenges involving uncertainty in whether a vehicle will yield are exacerbated in the context of autonomous vehicles, as the uncertainty is often conventionally resolved through behavioral cues or exchanges between the operators of vehicles. It is with these observations in mind, among others, that various aspects of the present disclosure were conceived and developed.

SUMMARY

Implementations described and claimed herein address the foregoing problems by providing systems and methods for controlling an autonomous vehicle. In one implementation, the autonomous vehicle is navigated along a route towards a flow of traffic. The flow of traffic includes a first vehicle followed by a second vehicle, the second vehicle followed by a third vehicle, a first gap between the first vehicle and the second vehicle, and a second gap between the second vehicle and the third vehicle. A motion plan for directing the autonomous vehicle into the flow of traffic at an interaction zone is generated. Generation of the motion plan comprises determining whether an ability of the autonomous vehicle to enter the interaction zone at the second gap at a time of replanning exceeds a confidence threshold. The autonomous vehicle is autonomously navigated into the flow of traffic at the first gap when the ability of the autonomous vehicle to enter the interaction zone at the second gap at the time of replanning exceeds the confidence threshold. The motion plan forgoes navigation of the autonomous vehicle into the flow of traffic at the first gap and the second gap when the ability of the autonomous vehicle to enter the interaction zone at the second gap at the time of replanning does not exceed the confidence threshold.

In another implementation, a perception system detects a first vehicle and a second vehicle in a flow of traffic. The second vehicle follows the first vehicle, with a first gap between the first vehicle and the second vehicle and a second gap following the second vehicle. The flow of traffic has an interaction zone towards which the autonomous vehicle is navigating. A motion controller has at least one processing unit in communication with the perception system. The motion controller generates a motion plan for directing the autonomous vehicle into the flow of traffic at the interaction zone. The motion plan is generated based on a determination of whether an ability of the autonomous vehicle to enter the interaction zone at the second gap at a time of replanning exceeds a confidence threshold. One or more vehicle subsystems are in communication with the motion controller. The one or more vehicle subsystems autonomously navigate the autonomous vehicle into the flow of traffic at the first gap when the ability of the autonomous vehicle to enter the interaction zone at the second gap at the time of replanning exceeds the confidence threshold and forgo navigation of the autonomous vehicle into the flow of traffic at the first gap and the second gap when the ability of the autonomous vehicle to enter the interaction zone at the second gap at the time of replanning does not exceed the confidence threshold.

In another implementation, traffic flow data for a flow of traffic towards which an autonomous vehicle is navigating is received. The flow of traffic includes a first vehicle followed by a second vehicle with a first gap between the first vehicle and the second vehicle and a second gap following the second vehicle. An uncertainty in whether the second vehicle will yield to the autonomous vehicle at an interaction zone is identified. A motion plan for directing the autonomous vehicle into the flow of traffic at the interaction zone is generated. The motion plan is generated based on a determination of whether an ability of the autonomous vehicle to enter the interaction zone at the second gap at a time of replanning exceeds a confidence threshold. Vehicle subsystem data is generated based on the motion plan. The vehicle subsystem data is communicated to at least one vehicle subsystem for autonomously navigating the autonomous vehicle into the flow of traffic at the first gap when the ability of the autonomous vehicle to enter the interaction zone at the second gap at the time of replanning exceeds the confidence threshold and forgoing navigation of the autonomous vehicle into the flow of traffic at the first gap and the second gap when the ability of the autonomous vehicle to enter the interaction zone at the second gap at the time of replanning does not exceed the confidence threshold.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to systems and methods for directing an autonomous vehicle into a flow of traffic given an uncertainty in yielding agents at an interaction zone. Generally, as the autonomous vehicle navigates towards an interaction zone in a flow of traffic, each vehicle in the flow of traffic is designated as a non-yielding agent or a yielding agent and gaps in the flow of traffic between these agents are identified. At a planning cycle, a motion plan is generated to enter the flow of traffic at a first gap between a non-yielding agent and a yielding agent. If it is determined that the first gap exceeds an initial confidence threshold, the autonomous vehicle enters the interaction zone at the first gap. If the first gap is uncertain where there is uncertainty in whether the yielding agent will yield to the autonomous vehicle at the interaction zone, the autonomous vehicle hedges to enter the flow of traffic at a second gap following the yielding agent without computing a different motion plan.

As such, the autonomous vehicle generates a motion plan for entering a flow of traffic at a first gap preceding a yielding agent while accounting for uncertainty in whether the yielding agent will actually yield. Stated differently, the autonomous vehicle generates a single motion plan at a planning cycle for entering the flow of traffic at a first gap while hedging for a second gap in the flow of traffic. Additionally, in connection with the motion plan, the autonomous vehicle communicates an intent to the yielding agent to enter the first gap, for example using a behavior profile, while hedging for the second gap should the yielding agent not yield. The presently disclosed technology thus addresses uncertainty in directing an autonomous vehicle into a flow of traffic, while decreasing computational burdens of motion planning and communicating intent to influence other vehicles, among other advantages.

The various systems and methods disclosed herein generally provide for directing an autonomous vehicle into a flow of traffic given an uncertainty in yielding agents at an interaction zone. The example implementations discussed herein reference a traffic environment involving a first traffic lane merging into a second traffic lane, such as in the context of a highway onramp. However, it will be appreciated by those skilled in the art that the presently disclosed technology is application in other traffic environments involving interactions among vehicles, including, without limitation, lane merges, lane changes, intersections, parking lots, and/or other shared spaces.

Figure 1:
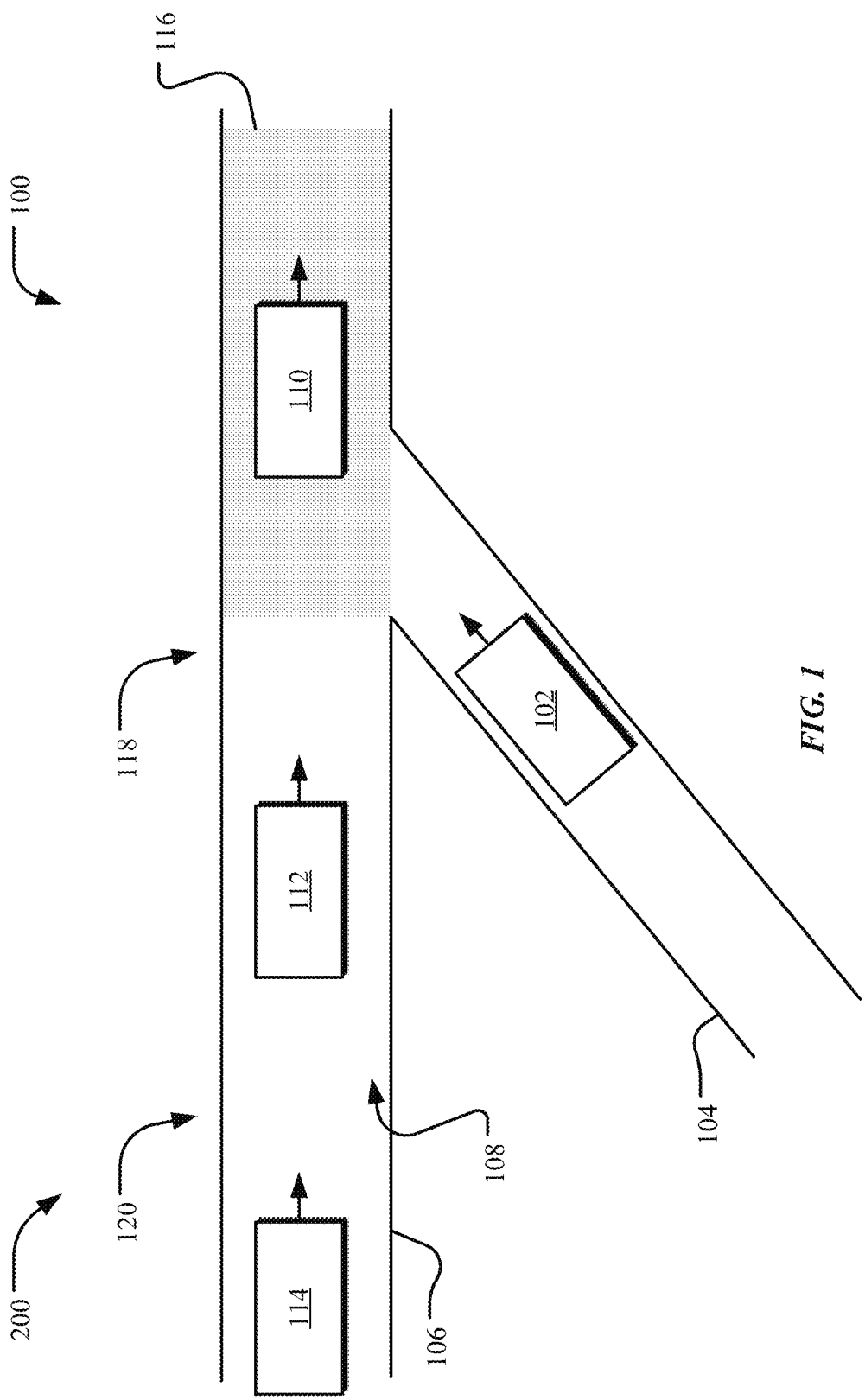
FIG. 1 is a block diagram of an example traffic environment with an autonomous vehicle hedging for different gaps in a flow of traffic.

To begin a detailed description of an example traffic environment 100 with an autonomous vehicle 102 hedging for different gaps, reference is made to FIG. 1. In one implementation, the autonomous vehicle 102 is autonomously navigating along a first lane 104 in a route and approaching a second lane 106 in the route. The second lane 106 includes a flow of traffic 108 having a first vehicle 110, a second vehicle 112, and a third vehicle 114. Within the flow of traffic 108, the second vehicle 112 is following (e.g., traveling behind) the first vehicle 110, and the third vehicle 114 is following (e.g., travelling behind) the second vehicle 112. An interaction zone 116 is defined within the flow of traffic 108 at which the autonomous vehicle 102 enters the second lane 106 from the first lane 104.

In one implementation, to avoid conflict with the vehicles 110-114 when entering the interaction zone 116, the autonomous vehicle 102 generates a first motion plan at a first planning cycle for entering the interaction zone 116 in view of the behavior of the vehicles 110-114 and an uncertainty of that behavior. In generating the first motion plan, the autonomous vehicle 102 designates the first vehicle 110 a non-yielding agent and each of the second vehicle 112 and the third vehicle 114 as yielding agents. The autonomous vehicle 102 may designate vehicles as non-yielding agents or yielding agents based on vehicle velocity, vehicle position relative to the interaction zone 116, vehicle acceleration, vehicle behavior profile, motion constraints of the autonomous vehicle 102, and/or the like.

With the first vehicle 110 designated as a non-yielding agent and each of the vehicles 112-114 designated as yielding agents, a first gap 118 between the first vehicle 110 and a second gap 120 between the second vehicle 112 and the third vehicle 114 are defined. In one implementation, at the first planning cycle, the autonomous vehicle 102 generates the first motion plan for the autonomous vehicle 102 to enter the interaction zone 116 at the first gap 118 as a primary gap. In connection with the first motion plan, the autonomous vehicle 102 determines whether the first gap 118 exceeds an initial confidence threshold (e.g., whether the first gap 118 is uncertain).

The first gap 118 exceeds an initial confidence threshold where the autonomous vehicle 102 determines that the second vehicle 112 will yield to the autonomous vehicle 102 at the interaction zone 116. For example, the initial confidence threshold may be exceeded where the second vehicle 112 will yield to the autonomous vehicle 102 based a traffic regulation is applicable that gives the autonomous vehicle 102 the right of way to enter the interaction zone 116. Alternatively or additionally, the initial confidence threshold may be exceeded where that the second vehicle 112 will yield to the autonomous vehicle 102 based on a motion profile of the second vehicle 112. For example, where the motion profile of the second vehicle 112 is such that of any action the second vehicle 112 could take (e.g., a maximum acceleration towards the interaction zone 116) and the autonomous vehicle 102 will be able to enter the interaction zone 116 at the first gap 118 within comfort and motion constraints of the autonomous vehicle 102, the initial confidence threshold is exceeded.

In one implementation, the first gap 118 is uncertain where the autonomous vehicle 102 identifies an uncertainty in whether the second vehicle 112 will yield to the autonomous vehicle 102 at the interaction zone 116. Where the first gap 118 is uncertain, at the first planning cycle, the autonomous vehicle 102 determines whether an ability of the autonomous vehicle to enter the interaction zone at the second gap at a time of replanning exceeds a confidence threshold. The time of replanning corresponds to a point in the future at which the autonomous vehicle 102 will replan (e.g., 100 ms in the future). The autonomous vehicle 102 is autonomously navigated into the flow of traffic 108 at the first gap 118 when the ability of the autonomous vehicle 102 to enter the interaction zone 116 at the second gap 120 at the time of replanning exceeds the confidence threshold. The autonomous vehicle 102 forgoes navigation into the flow of traffic 108 at both the first gap 118 and the second gap 120 when the ability of the autonomous vehicle 102 to enter the interaction zone 116 at the second gap 120 at the time of replanning does not exceed the confidence threshold.

Stated differently, in one implementation, the autonomous vehicle 102 will navigate into the first gap 118 if the second gap 120 is feasible at the time of replanning in the future, if stopping before the interaction zone 116 is feasible at the time of replanning in the future; or the first gap exceeds the initial confidence threshold at a current time. In other words, the autonomous vehicle 102 generates a motion plan optimized for the first gap 118 if any one of the following conditions are true: 1) a confidence that the second vehicle 112 will yield to the autonomous vehicle 102 at the interaction zone 116 exceeds the initial confidence threshold for the first gap 118; 2) an ability of the autonomous vehicle 102 to come to a stop before the interaction zone 116 exists at a time of replanning (e.g., at a next planning cycle, after executing an action); or 3) an ability of the autonomous vehicle 102 to enter the interaction zone 116 at the second gap 120 will exist at the time of replanning with a confidence that the third vehicle 114 will yield to the autonomous vehicle 102. As such, the autonomous vehicle 102 checks a feasibility of an alternative action at a next planning cycle to address the uncertainty of whether the yielding agents will yield to the autonomous vehicle 102 at the interaction zone 116.

Figure 2:
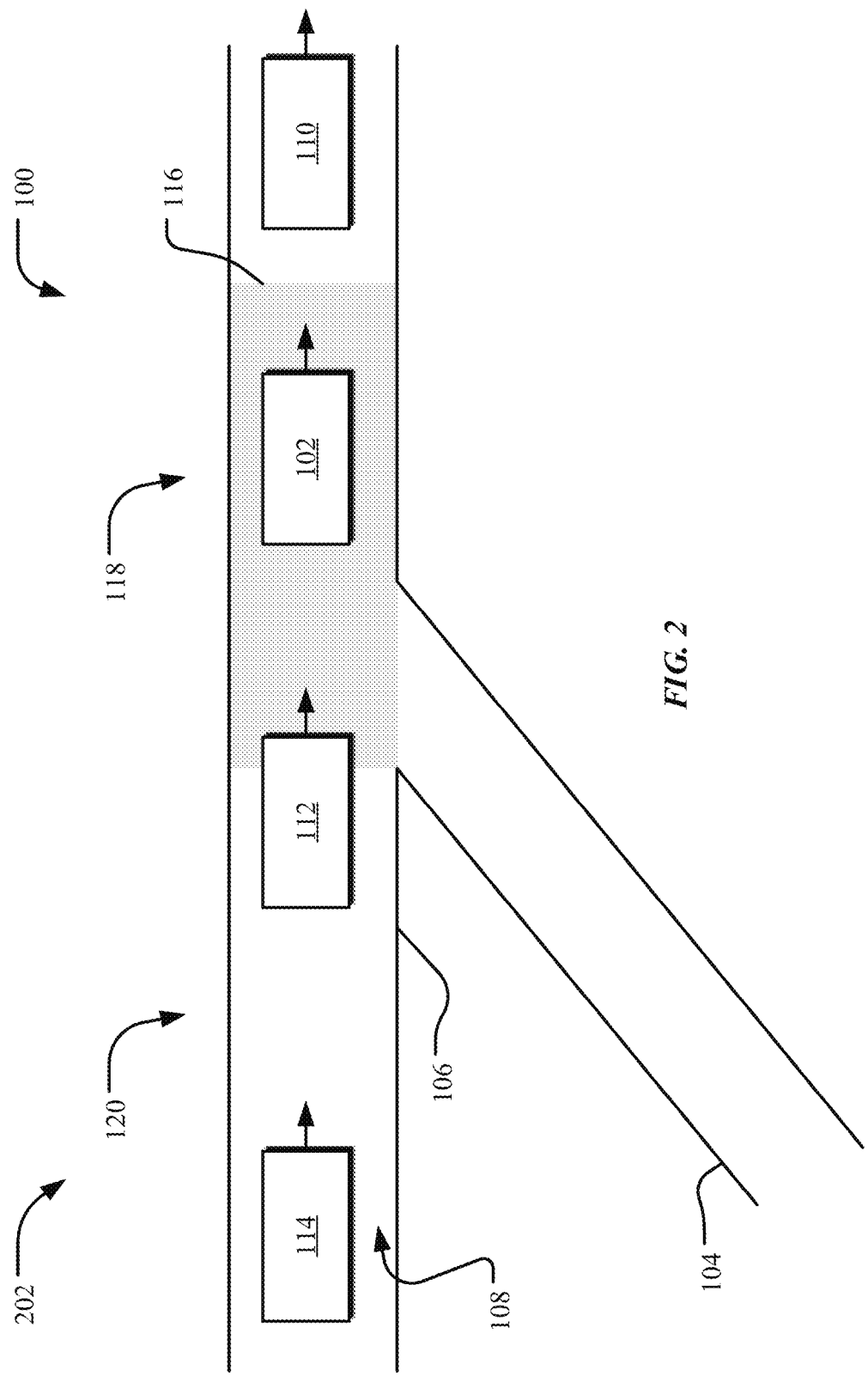
FIG. 2 shows a block diagram of the example traffic environment where the autonomous vehicle entered a first gap in the flow of traffic.
Figure 3:
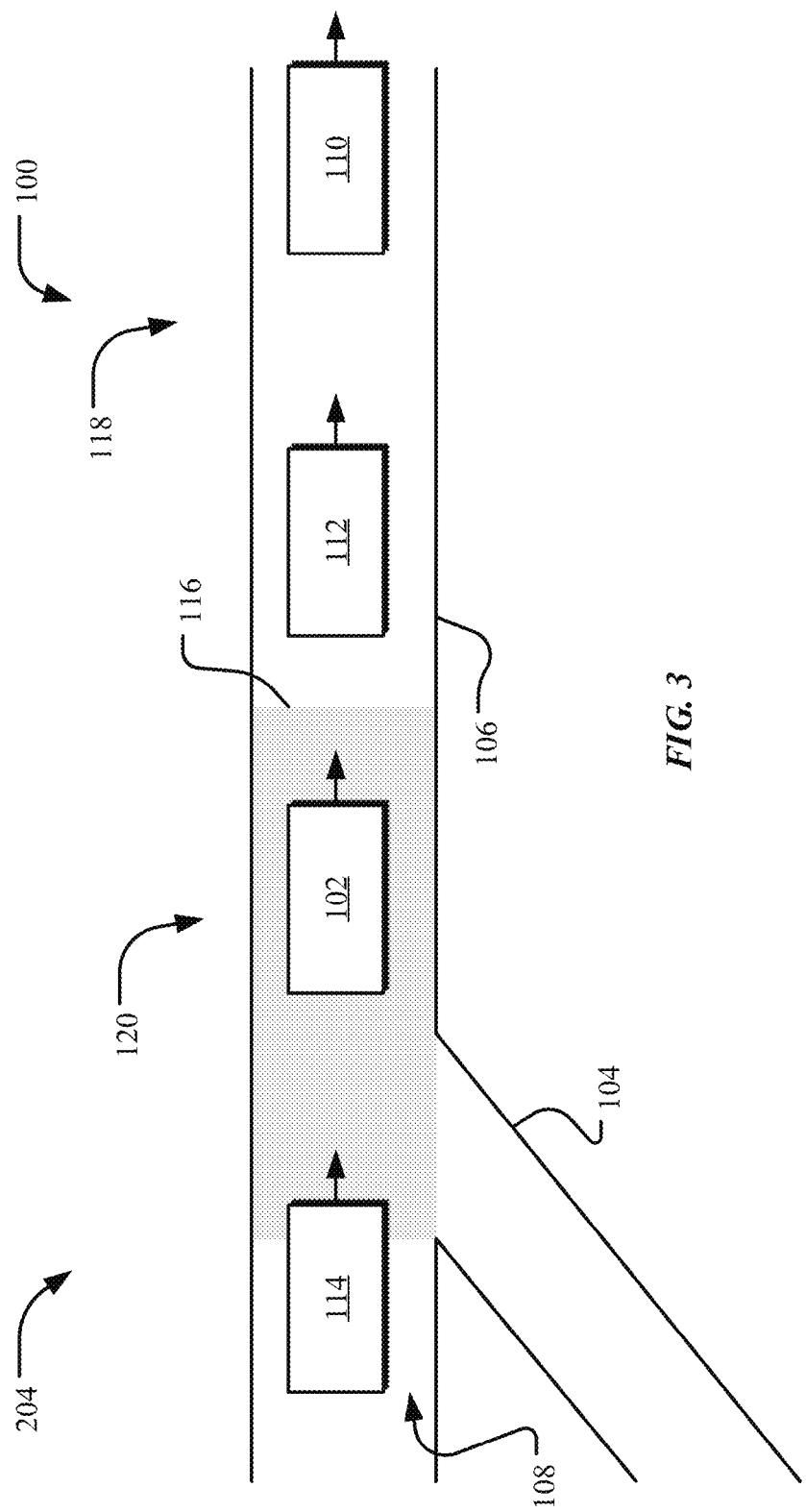
FIG. 3 illustrates a block diagram of the example traffic environment where the autonomous vehicle entered a second gap in the flow of traffic.

In determining whether the confidence threshold is exceeded, in one implementation, the autonomous vehicle 102 confirms that the first motion plan permits the autonomous vehicle 102 to hedge to enter the interaction zone 102 at the second gap 120 as an alternative gap to the primary gap in a second planning cycle without computing a different motion plan. Stated differently, in a first hedging case 200, the first motion plan for the autonomous vehicle 102 targets the first gap 118 for entering the interaction zone 116, while maintaining an option of entering the interaction zone 116 at the second gap 120 if the first gap 118 becomes unfeasible due to the motion of the second vehicle 112. As such, according to the first motion plan, the autonomous vehicle 102 plans for a first possible plan 202 in which the autonomous vehicle 102 enters the flow of traffic 108 in the first gap 118 according to a first velocity profile, as shown in FIG. 2, while hedging for as second possible plan 204 in which the autonomous vehicle 102 enters the flow of traffic 108 in the second gap 120 according to a second velocity profile, as shown in FIG. 3.

The autonomous vehicle 102 hedges for entering the flow of traffic 108 at the different gaps 118-120 for as long as possible as it navigates towards the interaction zone 116. In one implementation, as the autonomous vehicle 102 hedges for the different gaps 118-120, the autonomous vehicle 102 communicates an intent to the second vehicle 112 to enter the interaction zone 116 at the first gap 118 in an effort to influence the second vehicle 112 to yield to the autonomous vehicle 102. The autonomous vehicle 102 may communicate the intent through a behavior profile, an indicator displayed or presented to the second vehicle 112, a message sent to the second vehicle 112, and/or the like. The behavior profile may include a motion of the autonomous vehicle 102 consistent with targeting the first gap 118. For example, the autonomous vehicle 102 may accelerate or otherwise travel at a velocity relative to the second vehicle 112 indicating that the autonomous vehicle 102 intends to reach the interaction zone 116 prior to the second vehicle 112. The behavior profile of the autonomous vehicle 102 is such that it communicates the intent to enter at the first gap 118 while hedging to enter at the second gap 120 should the first gap 118 become unfeasible.

Should the autonomous vehicle 102 switch from the first possible plan 202 to the second possible plan 204 at a second planning cycle, the autonomous vehicle 102 follows the first motion plan directing the autonomous vehicle 102 into the interaction zone 116 at the second gap 120 within comfort constraints of the autonomous vehicle 102. In switching to the second possible plan 204, the autonomous vehicle 102 communicates an intent to enter to the second vehicle 112 and the third vehicle 114 to enter the interaction zone 116 at the second gap 120. The autonomous vehicle 102 may communicate the intent through a behavior profile, an indicator displayed or presented to the vehicles 112-114, a message sent to the vehicles 112-114, and/or the like. The behavior profile may include a motion of the autonomous vehicle 102 consistent with switching from targeting the first gap 118 to the second gap 120. For example, the autonomous vehicle 102 may decelerate at a first phase and accelerate at a second phase within comfort constraints of the autonomous vehicle 102 indicating that the autonomous vehicle 102 intends to reach the interaction zone 116 subsequent to the second vehicle 112 and prior to the third vehicle 114.

In one implementation, the first hedging case 200 involves the third vehicle 114 traveling towards the interaction zone 116 in the flow of traffic 108 with a motion profile such that the autonomous vehicle 102 cannot enter the interaction zone 116 at the second gap 120 at an arbitrary velocity. Instead, the second velocity profile of the first motion plan includes the autonomous vehicle 102 entering the interaction zone 116 at a time of arrival of the second vehicle 112 at the interaction zone 116 plus a buffer, while moving at a minimum velocity taking into account constraints imposed on the autonomous vehicle 102 by the third vehicle 114. Thus, the second velocity profile includes a minimum distance the autonomous vehicle 102 can cover by the time of arrival of the second vehicle 112 at the interaction zone 116 plus a buffer, while still ensuring that the autonomous vehicle 102 is moving at the minimum velocity within the constraints. This minimum distance is achieved where the autonomous vehicle 102 decelerates as much as possible for however long possible until a point at which it becomes necessary to accelerate at the highest acceleration to reach the minimum velocity.

As such, in one implementation, the second velocity profile includes a first phase and a second phase, with the first phase switching to the second phase at a switch time.

The first phase follows a minimum jerk profile, which involves a maximum negative jerk the autonomous vehicle 102 is capable of until it reaches a maximum negative acceleration of which the autonomous vehicle 102 is capable. The second phase follows a maximum jerk profile, which involves a maximum positive jerk the autonomous vehicle 102 is capable of until it reaches a maximum positive acceleration of which the autonomous vehicle 102 is capable. The switch time may be calculated based on an upper bound for acceleration of the autonomous vehicle 102, a lower bound for acceleration of the autonomous vehicle 102, an upper bound for jerk of the autonomous vehicle 102, a lower bound for jerk of the autonomous vehicle 102, a velocity of the autonomous vehicle 102 at a time of the planning cycle, and an acceleration of the autonomous vehicle 102 at the time of the planning cycle.

Given the switch time, the autonomous vehicle 102 computes a distance moved by the autonomous vehicle 102 until the time of arrival of the second vehicle 112 at the interaction zone 116 plus a buffer when the autonomous vehicle 102 follows the first motion plan. The autonomous vehicle 102 compares the distance to an actual distance from the autonomous vehicle 102 to the interaction zone 116, and if the distance is less than the actual distance, it is possible for the autonomous vehicle 102 to reach the interaction zone 116 at the time of arrival of the second vehicle 112 at the interaction zone 116 plus a buffer with a velocity that is at least the minimum velocity. Stated differently, if the distance is less than the actual distance, the second possible plan 204 is feasible where the autonomous vehicle 102 can hedge to enter the interaction zone 116 at the second gap 120 behind the second vehicle 112 and in front of the third vehicle 114.

FIGS. 1-3 involve the first hedging case 200 where the third vehicle 114 is relevant. However, in some hedging cases, the third vehicle 114 may be or may become irrelevant. For example, the third vehicle 114 may be moving such that no matter how the third vehicle 114 moves, the autonomous vehicle 102 can enter the second gap 120. In other examples, the third vehicle 114 may be irrelevant because it is missing from or no longer in the flow of traffic 108. In such hedging cases where the third vehicle 114 is irrelevant, the autonomous vehicle 102 may hedge to stop or hedge to go behind the second vehicle 112.

Figure 4:
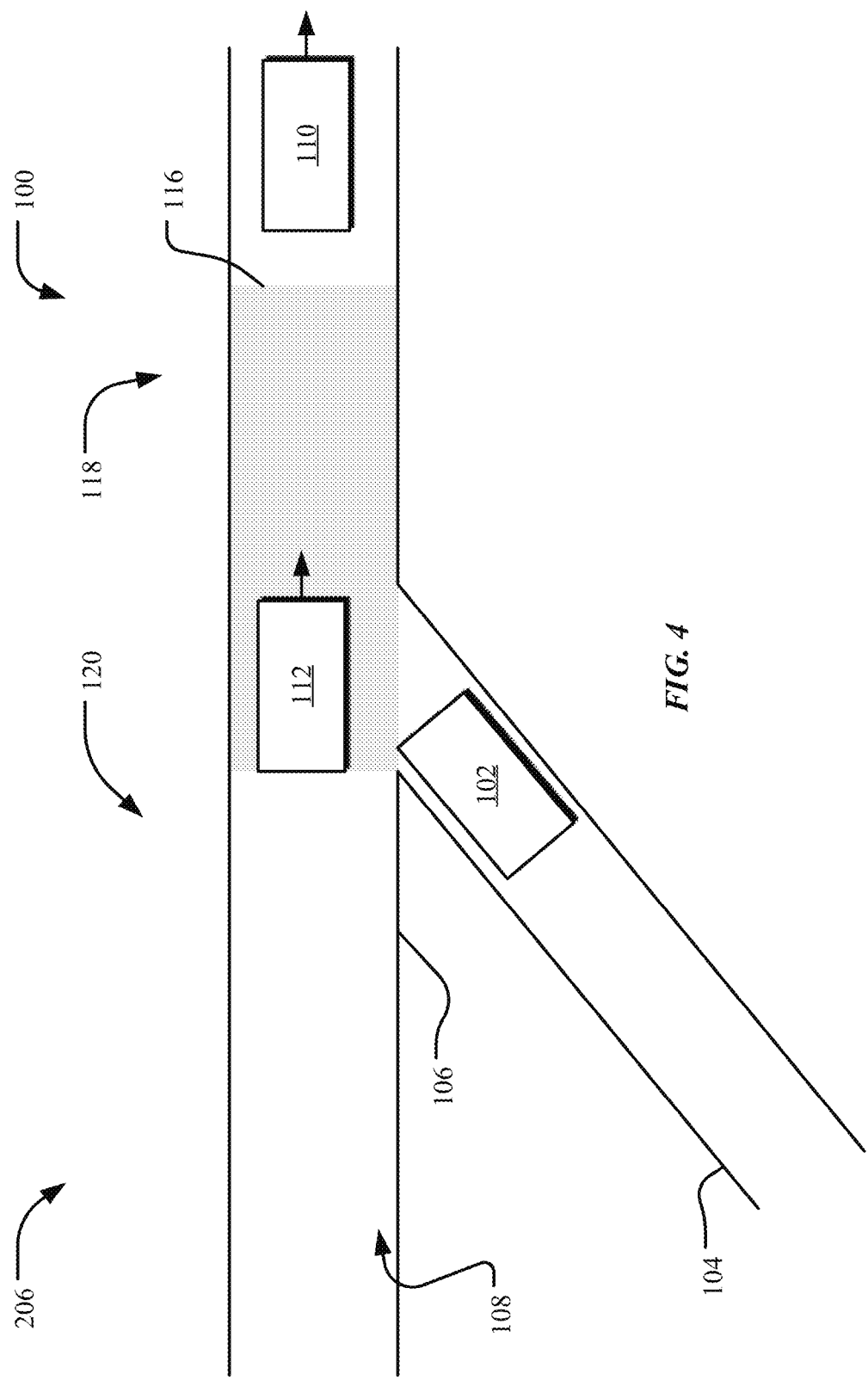
FIG. 4 is a block diagram of the example traffic environment where the autonomous vehicle hedges to stop.

Turning to FIG. 4, a second hedging case 206 where the autonomous vehicle 102 hedges to stop in the traffic environment 100 is illustrated. In one implementation, the autonomous vehicle 102 generates a first motion plan at a first planning cycle where the first gap 118 is targeted while hedging to stop prior to entering the interaction zone 116. Thus, the first motion plan includes a first velocity profile for directing the autonomous vehicle 102 into the first gap 118 that branches from a second velocity profile for stopping the autonomous vehicle 102 prior to entering the interaction zone 116. The first velocity profile branches from the second velocity profile at a time at which the autonomous vehicle 102 can replan at a new planning cycle. The second velocity profile involves a maximum deceleration while still satisfying jerk and acceleration constraints of the autonomous vehicle 102.

Using the second velocity profile, the autonomous vehicle 102 computes a distance moved by the autonomous vehicle 102 until the time of arrival of the second vehicle 112 at the interaction zone 116 plus a buffer when the autonomous vehicle 102 follows the first motion plan. The autonomous vehicle 102 compares the distance to an actual distance from the autonomous vehicle 102 to the interaction zone 116, and if the distance is less than the actual distance, it is possible for the autonomous vehicle 102 to stop prior to the interaction zone 116. Stated differently, if the distance is less than the actual distance, the autonomous vehicle 102 can hedge to stop and trivially enter the second gap 120 following the second vehicle 112.

Figure 5:
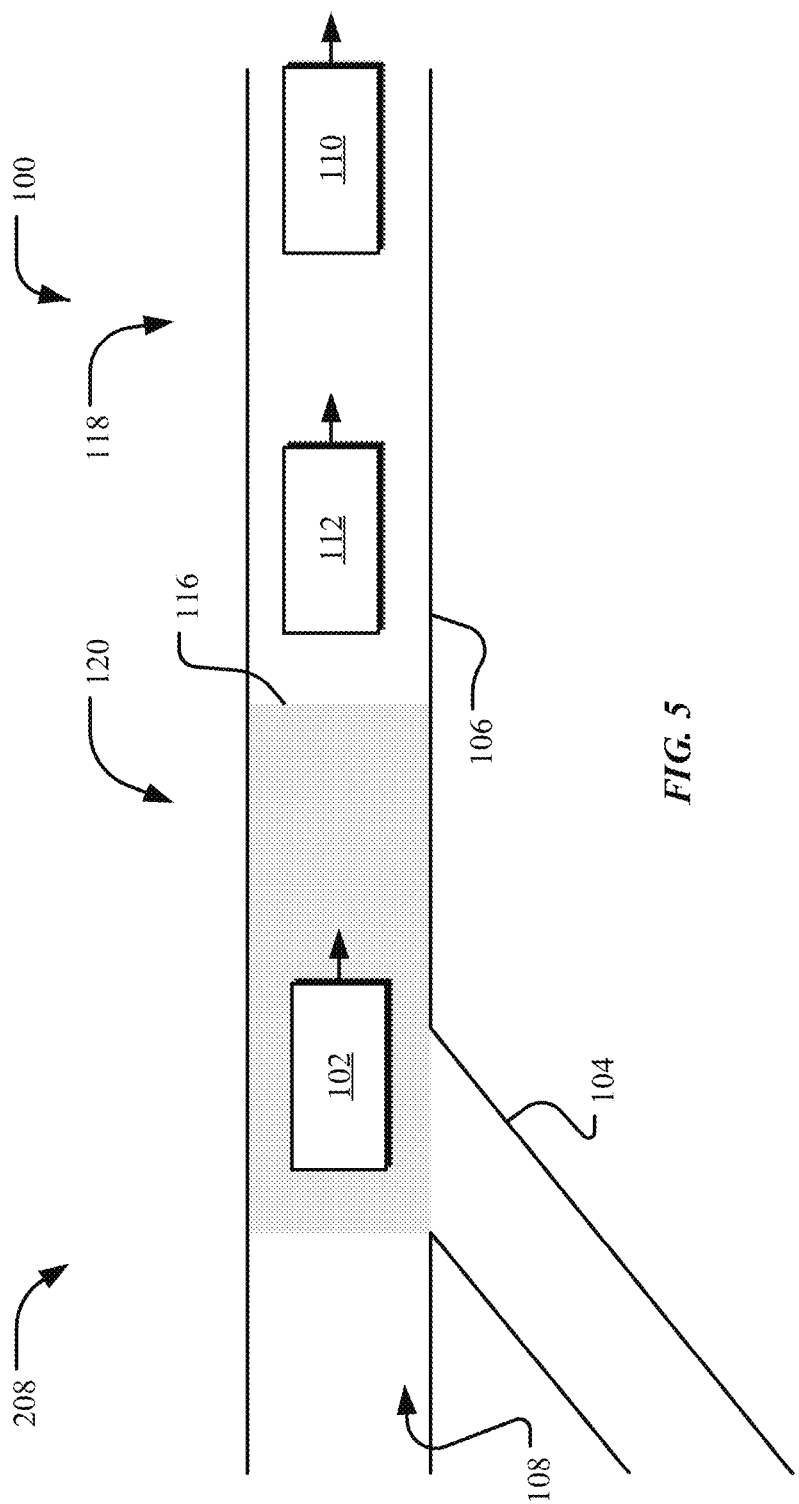
FIG. 5 depicts a block diagram of the example traffic environment where the autonomous vehicle hedges to go behind a vehicle at an arbitrary velocity.

Referring next to FIG. 5, a third hedging case 208 where the autonomous vehicle 102 hedges to go behind the second vehicle 112 at an arbitrary velocity in the traffic environment 100 is depicted. In one implementation, the autonomous vehicle 102 generates a first motion plan at a first planning cycle where the first gap 118 is targeted while hedging to enter the interaction zone 116 at the second gap 120 following the second vehicle 112. Thus, the first motion plan includes a first velocity profile for directing the autonomous vehicle 102 into the first gap 118 that branches from a second velocity profile for directing the autonomous vehicle 102 into the interaction zone 116 at the second gap 120 following the second vehicle 112. The first velocity profile branches from the second velocity profile at a time at which the autonomous vehicle 102 can replan at a new planning cycle. The second velocity profile involves a maximum deceleration until a time of arrival of the second vehicle 112 at the interaction zone 116 plus a buffer.

Using the second velocity profile, the autonomous vehicle 102 computes a distance moved by the autonomous vehicle 102 until the time of arrival of the second vehicle 112 at the interaction zone 116 plus a buffer when the autonomous vehicle 102 follows the first motion plan. The autonomous vehicle 102 compares the distance to an actual distance from the autonomous vehicle 102 to the interaction zone 116, and if the distance is equal to the actual distance, it is possible for the autonomous vehicle 102 to the interaction zone 116 at the second gap 120 after the second vehicle 112. Stated differently, if the distance is equal to the actual distance or a time of arrival of the autonomous vehicle 102 at the interaction zone 116 is after the time of arrival of the second vehicle 112 at the interaction zone 116 plus a buffer, the autonomous vehicle 102 can hedge to enter the second gap 120 following the second vehicle 112 at an arbitrary velocity.

In one implementation, at each planning cycle, the autonomous vehicle 102 confirms that the motion plan of that planning cycle includes both a primary plan and an alternative plan. For example, in each of the hedging cases 200, 206, and 208, the primary plan of the first motion plan involves directing the autonomous vehicle 102 into the first gap 118, and the alternative plan of the first motion plan involves directing the autonomous vehicle 102 into the second gap 120. An availability of the second gap 120 is open is the first hedging case 200 where the autonomous vehicle 102 can enter the interaction zone 116 at the second gap 120 between the second vehicle 112 and the third vehicle 114. With respect to the second hedging case 206, an availability of the second gap 120 is open where the autonomous vehicle 102 can stop prior to the interaction zone 116 and trivially enter the second gap 120 after the second vehicle 112. Similarly, an availability of the second gap 120 is open in the third hedging case 208 where the autonomous vehicle 102 can enter the second gap 120 at an arbitrary velocity behind the second vehicle 112. If the availability of the second gap 120 is open, the first motion plan includes both a primary plan and an alternative plan, so the autonomous vehicle 102 is autonomously navigated into either the first gap 118 or the second gap 120 based on the first motion plan. If the availability of the second gap 120 is closed, the autonomous vehicle 102 generates a second motion plan with the second gap 120 corresponding to a primary plan and a gap following the third vehicle 114 as an alternative plan.

Figure 6:
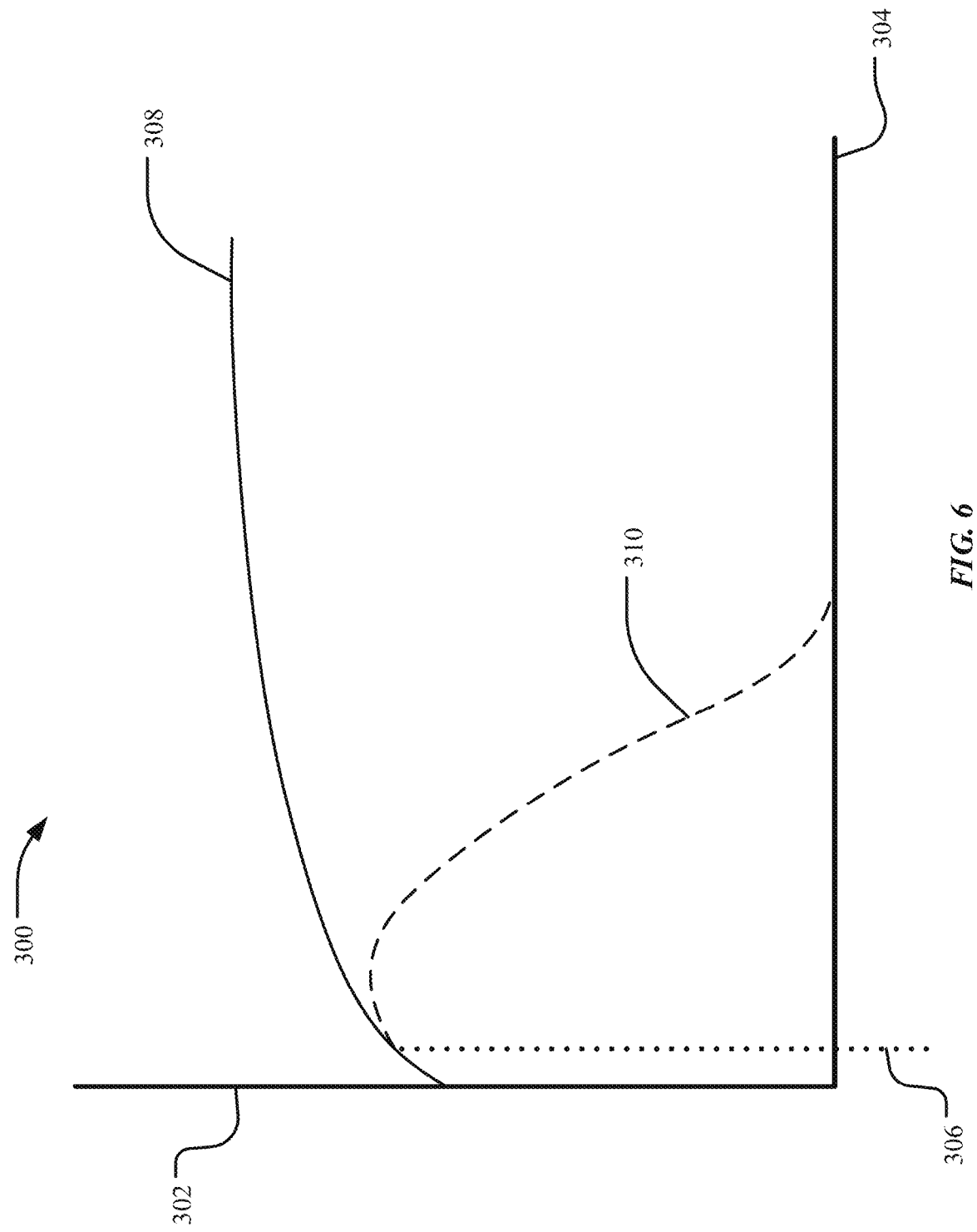
FIG. 6 illustrates a velocity profile graph in a case of when the autonomous vehicle hedges to stop.
Figure 7:
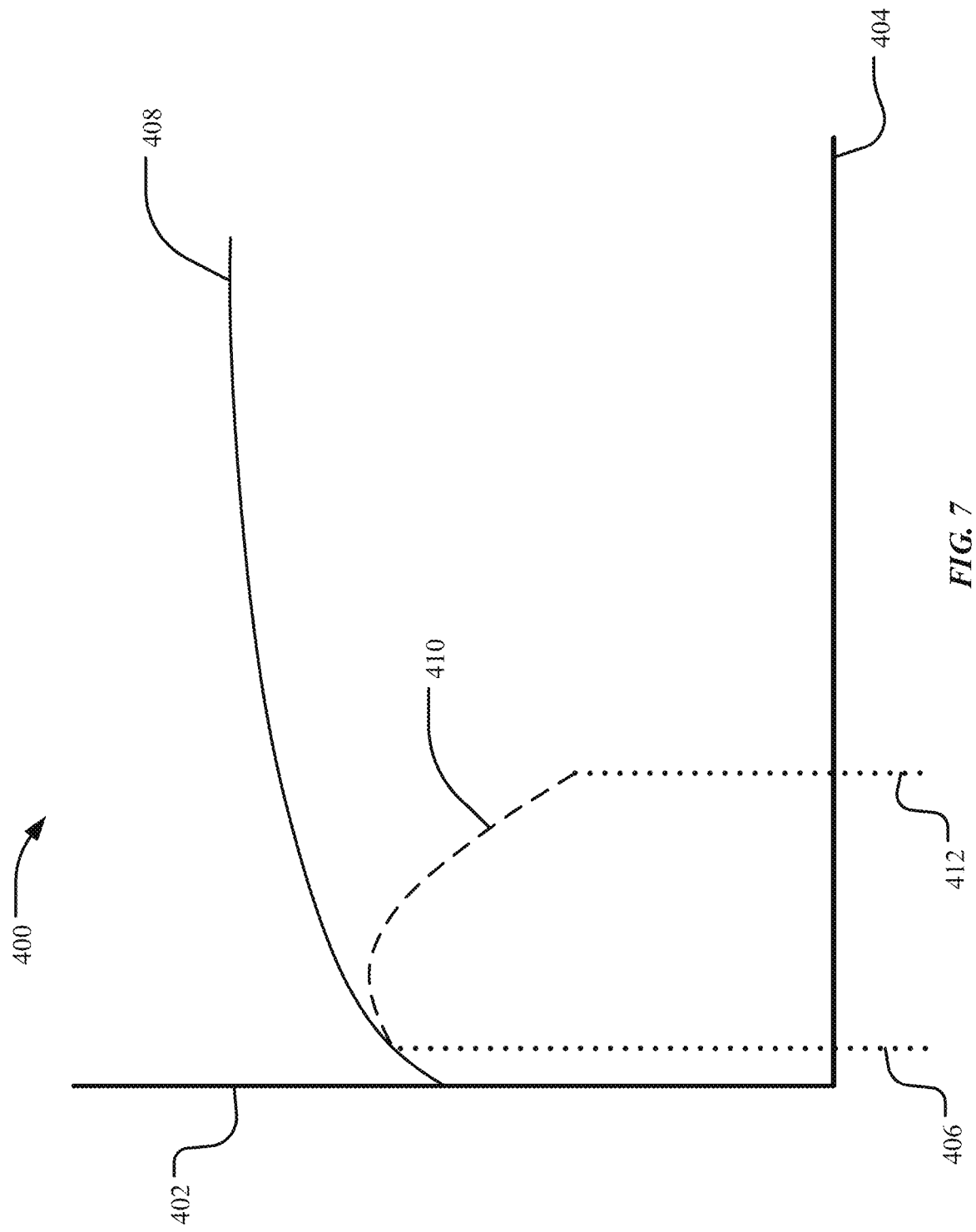
FIG. 7 depicts a velocity profile graph in a case of when the autonomous vehicle hedges to go behind a vehicle at an arbitrary velocity.
Figure 8:
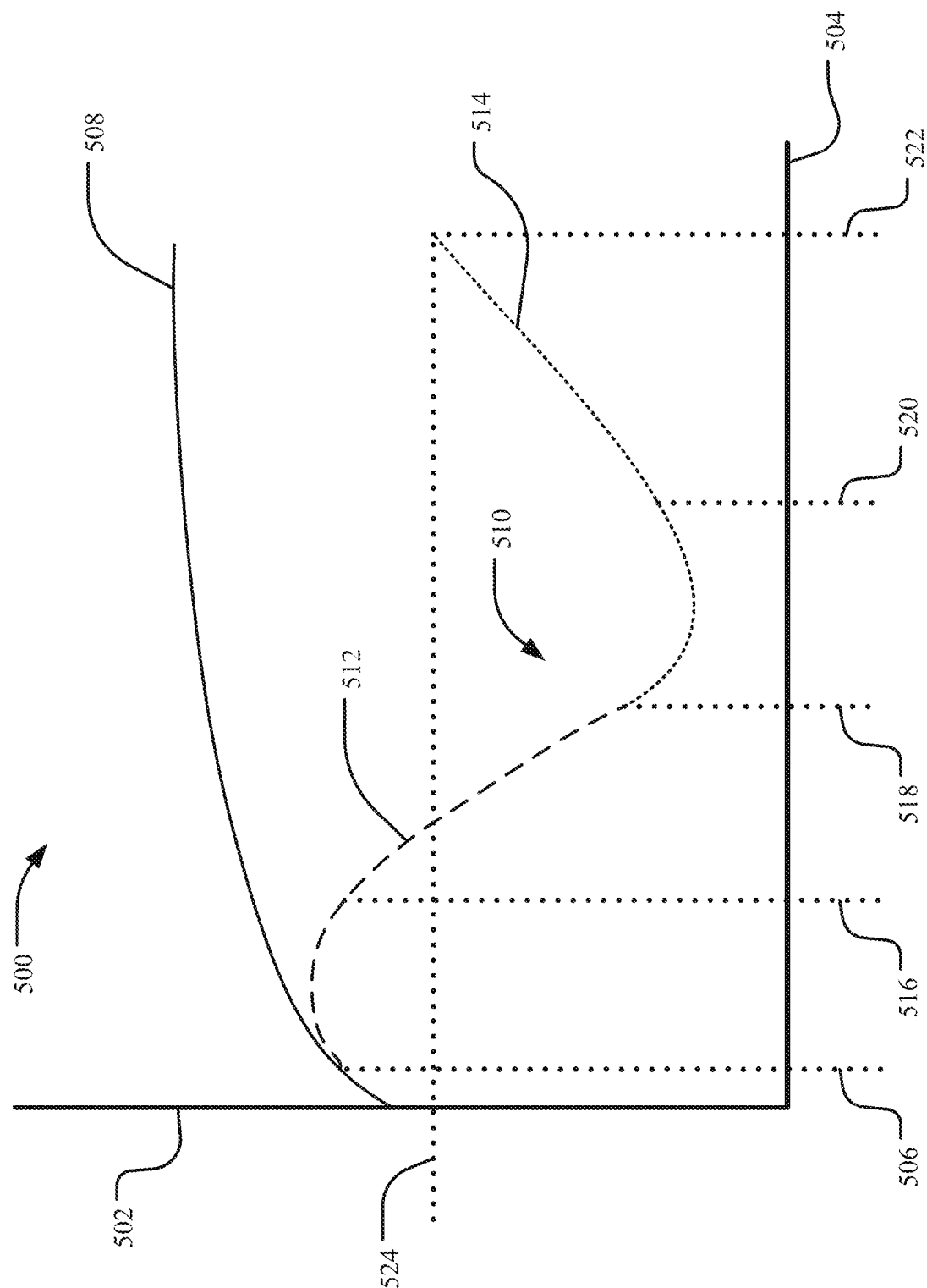
FIG. 8 illustrates a velocity profile graph in a case of when the autonomous vehicle hedges to enter a different gap.

Turning to FIGS. 6-8, velocity profile graphs corresponding to the hedging cases for the autonomous vehicle 102 are illustrated. Referring first to FIG. 6, a velocity profile graph 300 for the third hedging case 208 where the autonomous vehicle hedges to stop is shown. In one implementation, the velocity profile graph 300 includes a velocity axis 302 and a time axis 304 with a single motion plan for the autonomous vehicle 102 to enter the interaction zone 116 at the first gap 118 while hedging to stop prior to entering the interaction zone 116. The single motion plan includes a first velocity profile 308 branching from a second velocity profile 310 at a time of replanning 306 for the autonomous vehicle 102. The first velocity profile 308 is a smooth curve corresponding to a primary plan for entering the interaction zone 116 at the first gap 118, and the second velocity profile 310 corresponds to an alternative plan for stopping the autonomous vehicle 102 prior to entering the interaction zone 116.

As can be understood from the velocity profile graph 300, the second velocity profile 310 follows a curve having a maximum deceleration until a zero velocity is reached, while still satisfying jerk and acceleration constraints of the autonomous vehicle 102. If an area under the curve of the second velocity profile 310 is less than an actual distance to the interaction zone 116, the autonomous vehicle can stop prior to entering the interaction zone 116 and trivially enter the second gap 120 behind the second vehicle 112. Stated differently, if the area under the second velocity profile 310 is less than the actual distance to the interaction zone 116, the autonomous vehicle 102 can hedge to stop followed by trivially entering the interaction zone 116 following the second vehicle 112.

Turning to FIG. 7, a velocity profile graph 400 for the second hedging case 206 where the autonomous vehicle 102 hedges to go behind the second vehicle 112 is shown. In one implementation, the velocity profile graph 400 includes a velocity axis 402 and a time axis 404 with a single motion plan for the autonomous vehicle 102 to enter the interaction zone 116 at the first gap 118 while hedging to go behind the second vehicle 112. The single motion plan includes a first velocity profile 408 branching from a second velocity profile 410 at a time of replanning 406 for the autonomous vehicle 102. The first velocity profile 408 is a smooth curve corresponding to a primary plan for entering the interaction zone 116 at the first gap 118, and the second velocity profile 410 corresponds to an alternative plan for directing the autonomous vehicle 102 to enter the interaction zone 116 at an arbitrary velocity behind the second vehicle 112.

As can be understood from the velocity profile graph 400, the second velocity profile 410 follows a curve having a maximum deceleration until a time of arrival 412 at the interaction zone 116. An area under the curve of the second velocity profile 410 is equal to an actual distance to the interaction zone 116. The autonomous vehicle 102 is able to enter the interaction zone 116 at the second gap 120 if the time of arrival 412 of the autonomous vehicle 102 is greater than a time of arrival of the second vehicle 112 at the interaction zone 116 plus a buffer. The buffer may correspond to an amount of time sufficient to account for a deceleration of the second vehicle 112 and/or other movements or changes by the second vehicle 112. Thus, if the time of arrival 412 of the autonomous vehicle 102 under the second velocity profile 410 is less than the time of arrival of the second vehicle 112 at the interaction zone 116 plus a buffer, the autonomous vehicle 102 can hedge to go behind the second vehicle 112 and enter the second gap 120 at an arbitrary velocity.

As can be understood from FIG. 8, a velocity profile graph 500 for the first hedging case 200 includes a velocity axis 502 and a time axis 504 with a single motion plan for the autonomous vehicle 102 to enter the interaction zone 116 at the first gap 118 while hedging to enter the gap 120 between the second vehicle 112 and the third vehicle 114. The single motion plan includes a first velocity profile 508 branching from a second velocity profile 510 at a time of replanning 506 for the autonomous vehicle 102. The first velocity profile 508 is a smooth curve corresponding to a primary plan for entering the interaction zone 116 at the first gap 118, and the second velocity profile 510 corresponds to an alternative plan for directing the autonomous vehicle 102 to enter the interaction zone 116 at the second gap 120 between the second vehicle 112 and the third vehicle 114.

Because of the constraints imposed on the autonomous vehicle 102 by the third vehicle 114, the autonomous vehicle 102 cannot enter the interaction zone 116 at the second gap 120 at an arbitrary velocity. Instead, the autonomous vehicle 102 can enter the second gap 120 at a time of arrival 522 of the autonomous vehicle 102 interaction zone 116, where the time of arrival 522 is equal to a time of arrival of the second vehicle 112 at the interaction zone plus a buffer and the autonomous vehicle 102 is moving at a minimum velocity 524. Stated differently, the second velocity profile 510 corresponds to a minimum distance the autonomous vehicle 102 can cover by the time of arrival 522, while traveling at least the minimum velocity 524.

In one implementation, the second velocity profile 510 includes a first phase 512 and a second phase 514, such that the second velocity profile 510 follows a curve having a maximum deceleration for as long as possible until switching to a maximum acceleration to reach the minimum velocity 524. The first phase 512 follows a minimum jerk profile, and the second phase 514 follows a maximum jerk profile. The minimum jerk profile utilizes a most negative the autonomous vehicle 102 is capable of until it hits the most negative acceleration of which the autonomous vehicle 102 is capable. On the other hand, the maximum jerk profile utilizes a most positive jerk the autonomous vehicle 102 is capable of until it hits the most positive acceleration of which the autonomous vehicle 102 is capable.

The second velocity profile 510 switches from the first phase 512 to the second phase 514 at a switch time 518. In one implementation, the switch time 518 is calculated based on an upper bound for acceleration of the autonomous vehicle 102 ($a_{max}$), a lower bound for acceleration of the autonomous vehicle 102 ($a_{min}$), an upper bound for jerk of the autonomous vehicle 102 ($j_{max}$), a lower bound for jerk of the autonomous vehicle 102 ($j_{min}$), a velocity of the autonomous vehicle 102 ($v_R$) in the next planning cycle at the time of replanning 506 ($t_R$), an acceleration of the autonomous vehicle 102 ($a_R$) in the next planning cycle at the time of replanning 506 ($t_R$), the time of arrival 522 ($t_A$), and the minimum velocity 524 ($v_1$). For example, the switch time 518 ($t_S$) may be equal to:

$$t_s = \left(\frac{-a_{min}}{a_{max} - a_{min}}\right)t_R + \left(\frac{-a_{max}}{a_{max} - a_{min}}\right)t_A + \frac{v_R - v_z}{a_{max} - a_{min}} - \frac{(a_R - a_{min})^2}{2j_{min}(a_{max} - a_{min})} - \frac{a_{max} - a_{min}}{2j_{max}}$$

This formula for the switch time 518 may be calculated based on a relationship of: a first velocity $v_1$ of the autonomous vehicle 102 at the time of replanning 506, a second velocity $v_2$ of the autonomous vehicle 102 at a time 516, a third velocity $v_3$ of the autonomous vehicle 102 at the switch time 518, a fourth velocity $v_3$ of the autonomous vehicle 102 at a time 520, and the minimum velocity v of the autonomous vehicle 102 at the time of arrival 522. In one example, $a_{max}$ is approximately $$2\frac{m}{s^2},$$

$a_{min}$ is approximately $$-3.5\frac{m}{s^2},$$

$j_{max}$ is approximately $$2\frac{m}{s^3},$$

and $j_{min}$ is approximately $$-2\frac{m}{s^3}.$$

However, other values are contemplated.

Given the second velocity profile 510, the distance moved by the autonomous vehicle 102 according to the motion plan until the time of arrival 522 may be calculated. If the distance is less than or equal to an actual distance to the interaction zone 116, then it is possible for the autonomous vehicle 102 to reach the interaction zone 115 at the time of arrival 522 with a velocity which is at least the minimum velocity 524. Stated differently, if the distance moved by the autonomous vehicle 102 until the time of arrival 522 is less than or equal to the actual distance to the interaction zone 116, the autonomous vehicle 102 can hedge to enter the second gap 120 between the second vehicle 112 and the third vehicle 114.

In one implementation, each of the second velocity profiles 310, 410, and 510 correspond to a worst case scenario for each of the respective hedging cases 208, 206, and 200 within the constraints of the autonomous vehicle 102. As such, if the autonomous vehicle 102 maintains the feasibility of the second velocity profiles 310, 410, and 510, the autonomous vehicle 102 maintains a feasibility of all possible actions that the autonomous vehicle 102 could take within the constraints to enter the interaction zone 116 at the second gap 120. The second velocity profiles 310, 410, and 510 may thus correspond to a lowest comfort action of the autonomous vehicle 102 to enter at the second gap 120. The autonomous vehicle 102 will optimize to enter at the second gap 120 according to a high of comfort action as possible, but ensures the availability of the second gap 120 based on the feasibility of the lowest comfort action corresponding to the second velocity profiles 310, 410, and 510.

Figure 9:
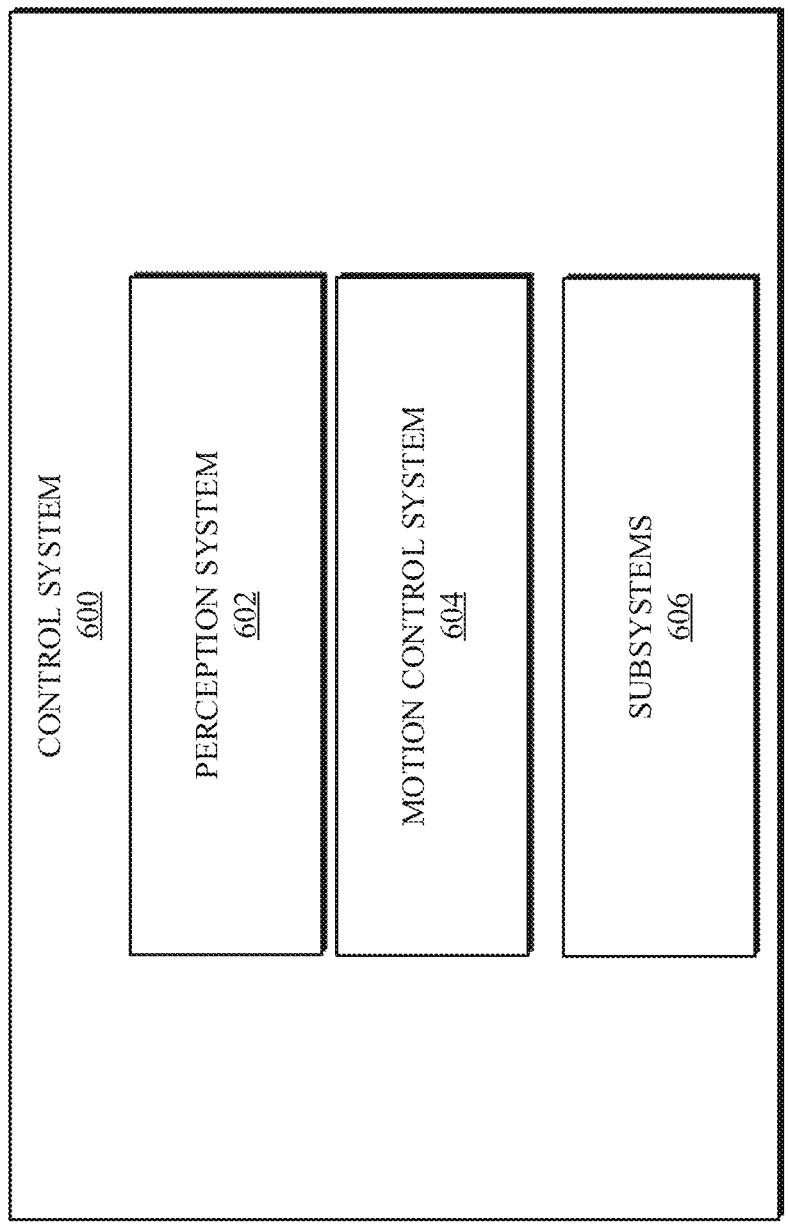
FIG. 9 shows an example vehicle control system for an autonomous vehicle.

FIG. 9 shows an example vehicle control system 600 for the autonomous vehicle 102. In one implementation, the vehicle control system 600 includes a perception system 602, a motion control system 604, and vehicle subsystems 606. The perception system 602 includes one or more sensors, such as imagers, LIDAR, RADAR, etc., to capture information regarding objects in a field of view of the autonomous vehicle 102. For example, the perception system 602 may capture traffic flow data for the flow of traffic 108, including a location of and motion information regarding the vehicles within the flow of traffic 108, such as the vehicles 110-114. The perception system 602 may further capture information to define the interaction zone 116, as well as measuring, tracking, and/or estimating an actual distance of the autonomous vehicle 102 to the interaction zone 116. In one implementation, the perception system 602 senses point cloud data, which is utilized for determining a location, velocity, acceleration, and other motion of the vehicles 110-114. The perception system 602 may further utilize localization systems and methods to determine vehicle location and movement. The motion control system 604 may include one or more computing units, such as CPU(s), GPU(s), etc., to generate a motion plan for the autonomous vehicle 102 at a planning cycle and hedging for a primary option and an alternative option for as long as possible, as described herein. The motion control system 604 generates vehicle subsystems data for controlling the autonomous vehicle 102 with the vehicle subsystems 606 according to the motion plan.

Figure 10:
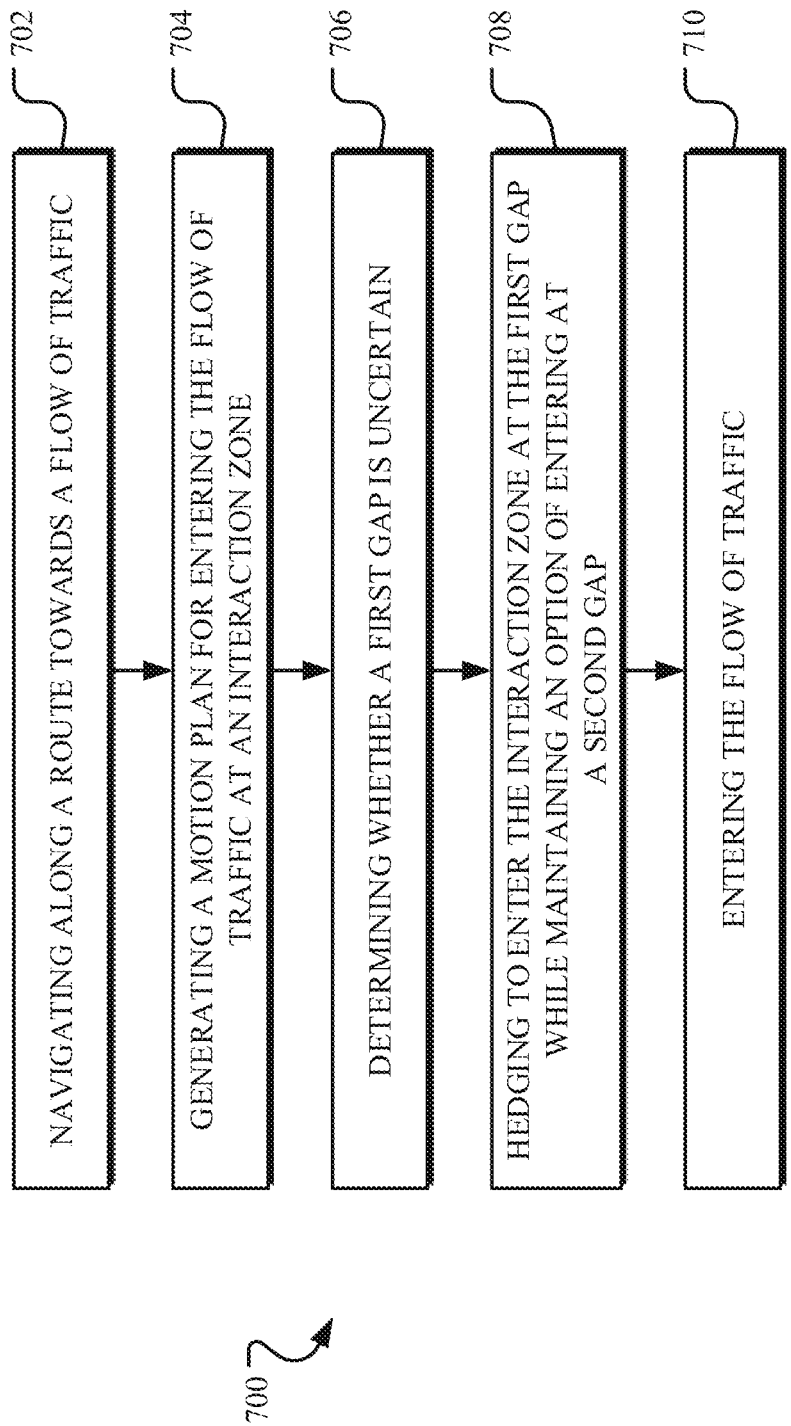
FIG. 10 illustrates example operations for controlling an autonomous vehicle.

FIG. 10 illustrates example operations 700 for controlling an autonomous vehicle. In one implementation, an operation 702 navigates the autonomous vehicle along a route towards a flow of traffic. The flow of traffic includes a first vehicle followed by a second vehicle, and the second vehicle is followed by a third vehicle. An operation 704 generates a motion plan at a planning cycle for directing the autonomous vehicle into the flow of traffic at an interaction zone. In one implementation, the motion plan designates the first vehicle as a non-yielding agent the second and third vehicles as yielding agents. The motion plan includes a first velocity profile for entering the interaction zone at a first gap between the first vehicle and the second vehicle and a second velocity profile for entering the interaction zone at a second gap following the second vehicle.

In one implementation, the second velocity profile corresponds to a minimum distance the autonomous vehicle can cover by a time of arrival of the second vehicle at the interaction zone plus a buffer, while moving at a minimum velocity within constraints imposed by the third vehicle. The second velocity may include a first phase and a second phase, the second velocity profile switching from the first phase to the second phase at a switch time. In one implementation, the first phase follows a minimum jerk profile, and the second phase follows a maximum jerk profile. The switch time may be calculated based on an upper bound for acceleration of the autonomous vehicle, a lower bound for acceleration of the autonomous vehicle, an upper bound for jerk of the autonomous vehicle, a lower bound for jerk of the autonomous vehicle, a velocity of the autonomous vehicle at a time of the planning cycle, and an acceleration of the autonomous vehicle at the time of the planning cycle.

In some cases, the third vehicle may be determined to be irrelevant. In one example of where that may be the case, the second velocity profile includes a maximum deceleration within a jerk constraint and an acceleration constraint, with the second velocity profile corresponding to a distance that is less than an actual distance to the interaction zone. In other example of where that may be the case, the second velocity profile includes a deceleration such that a time of arrival of the autonomous vehicle at the interaction zone is greater than an arrival of the second vehicle plus a buffer, with the autonomous vehicle entering the interaction zone at an arbitrary velocity.

An operation 706 determines whether the first gap is uncertain. In one implementation, the first gap is determined to be uncertain or not based on an initial confidence threshold involving whether the second vehicle will yield to the autonomous vehicle at the interaction zone, a right of way of one of the autonomous vehicle or the second vehicle to enter the interaction zone, and/or the like. An operation 708 hedges to enter the interaction zone at the first gap while maintaining an option of entering the interaction zone at the second gap based on the motion plan when the first gap is uncertain. In examples where the third vehicle is determined to be irrelevant, the operation 708 may include hedging to stop followed by trivially entering the second gap or hedging to go behind the second vehicle at the second gap.

An operation 710 autonomously directing the autonomous vehicle into the flow of traffic at the interaction zone based on an availability of the option of entering the interaction zone at the second gap. In one implementation, the autonomous vehicle enters either the first gap or the second gap when the availability of the option of entering the interaction zone at the second gap is open. The operation 704 generates a second motion plan when the availability of the option of entering the interaction zone at the second gap is closed. In one implementation, a distance moved by the autonomous vehicle until a time of arrival at the interaction zone is computed based on the second velocity profile. This distance is compared to an actual distance to the interaction zone. The availability of the option of entering the interaction zone at the second gap is open when the distance is less than or equal to the actual distance. In one implementation, the operation 710 further autonomously communicates an intent to enter the interaction zone at the first gap to the second vehicle. The intent may be through movement of the autonomous vehicle based on the motion plan.

Figure 11:
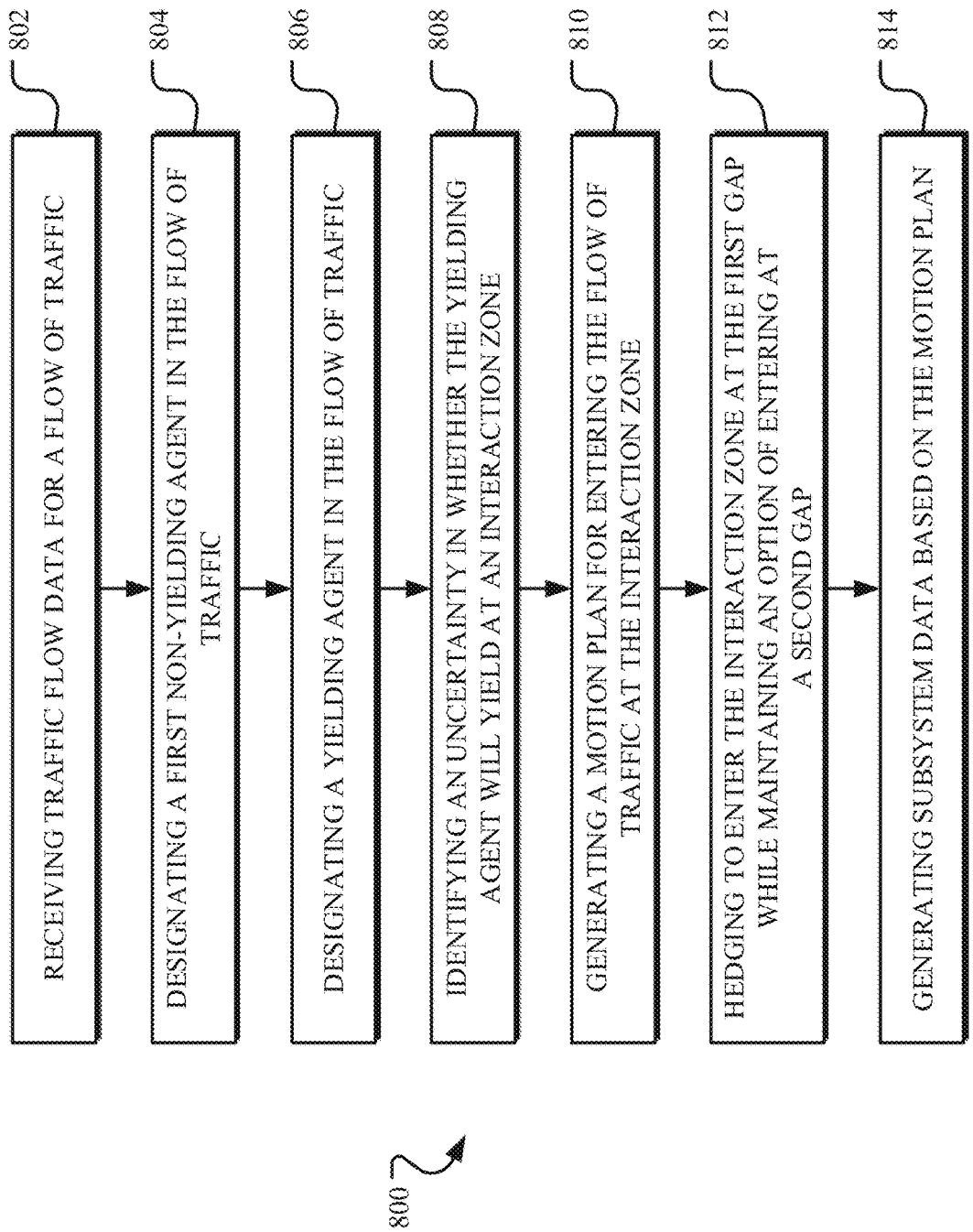
FIG. 11 illustrates example operations for controlling an autonomous vehicle.

FIG. 11 illustrates example operations 800 for controlling an autonomous vehicle. In one implementation, an operation 802 receives traffic flow data for a flow of traffic towards which an autonomous vehicle is navigating. The flow of traffic includes a first vehicle followed by a second vehicle. An operation 804 designates the first vehicle as a non-yielding agent, and an operation 806 designates the second vehicle as a yielding agent. In one implementation, the operation 806 may further designate a third vehicle as a second yielding agent.

An operation 808 identifies an uncertainty in whether the yielding agent will yield to the autonomous vehicle at an interaction zone. An operation 810 generates a motion plan for directing the autonomous vehicle into the flow of traffic at the interaction zone. The motion plan includes a first velocity profile for entering the interaction zone at a first gap between the non-yielding agent and the yielding agent and a second velocity profile for entering the interaction zone at a second gap following the yielding agent. An operation 812 hedges to enter the interaction zone at the first gap while maintaining an option of entering the interaction zone at the second gap based on the motion plan.

In one implementation, the second velocity profile switches from the first phase to the second phase at a switch time. The first phase follows a minimum jerk profile, and the second phase follows a maximum jerk profile. In this case, the operation 812 includes hedging to stop followed by trivially entering the second gap and/or hedging to go behind the yielding agent at the second gap. In another implementation, where the third vehicle is designated as a second yielding agent, the second gap is between the first yielding agent and the second yielding agent. In this case, the second velocity profile corresponds to a minimum distance the autonomous vehicle can cover by a time of arrival of the first yielding agent at the interaction zone plus a buffer, while moving at a minimum velocity within constraints imposed by the second yielding agent.

An operation 714 generates vehicle subsystem data based on the motion plan. The vehicle subsystem data is communicated vehicle subsystem(s) for autonomously directing the autonomous vehicle into the flow of traffic at the interaction zone based on an availability of the option of entering the interaction zone at the second gap.

Figure 12:
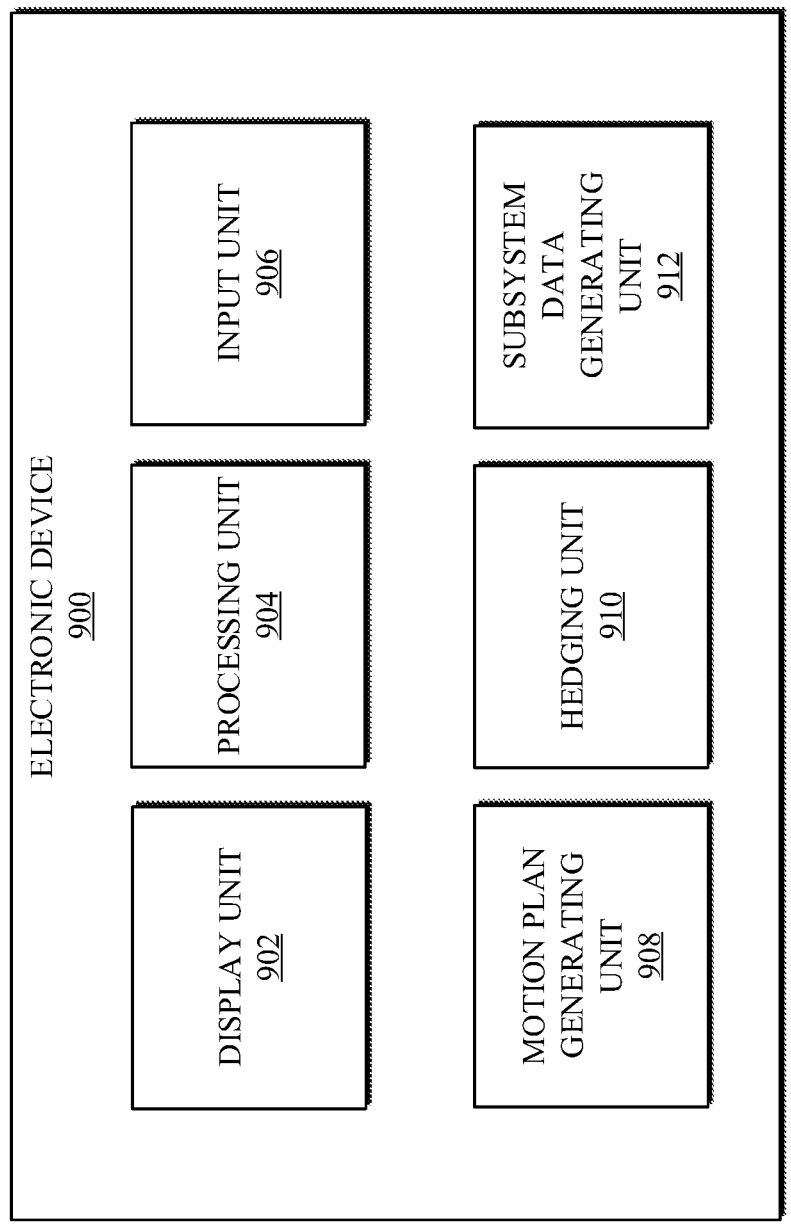
FIG. 12 depicts a block diagram of an electronic device including operational units arranged to perform various operations of the presently disclosed technology.

Turning to FIG. 12, an electronic device 900 including operational units 902-912 arranged to perform various operations of the presently disclosed technology is shown. The operational units 902-912 of the device 900 are implemented by hardware or a combination of hardware and software to carry out the principles of the present disclosure. It will be understood by persons of skill in the art that the operational units 902-912 described in FIG. 9 may be combined or separated into sub-blocks to implement the principles of the present disclosure. Therefore, the description herein supports any possible combination or separation or further definition of the operational units 902-912.

In one implementation, the electronic device 900 includes a display unit 902 configured to display information, such as a graphical user interface, and a processing unit 904 in communication with the display unit 902 and an input unit 906 configured to receive data from one or more input devices or systems. Various operations described herein may be implemented by the processing unit 904 using data received by the input unit 906 to output information for display using the display unit 902.

Additionally, in one implementation, the electronic device 900 includes units implementing the operations described with respect to FIG. 11. For example, the input unit 906 may perform the operation 802, one or all of the operations 804-810 may be implemented by a motion plan generating unit 908, the operation 812 may be implemented by a hedging unit 910, and the operation 814 may be implemented with a subsystem data generating unit 912. In some implementations, a controlling unit implements various operations for controlling the operation of a vehicle based on the operations implemented by the units 902-912.

Figure 13:
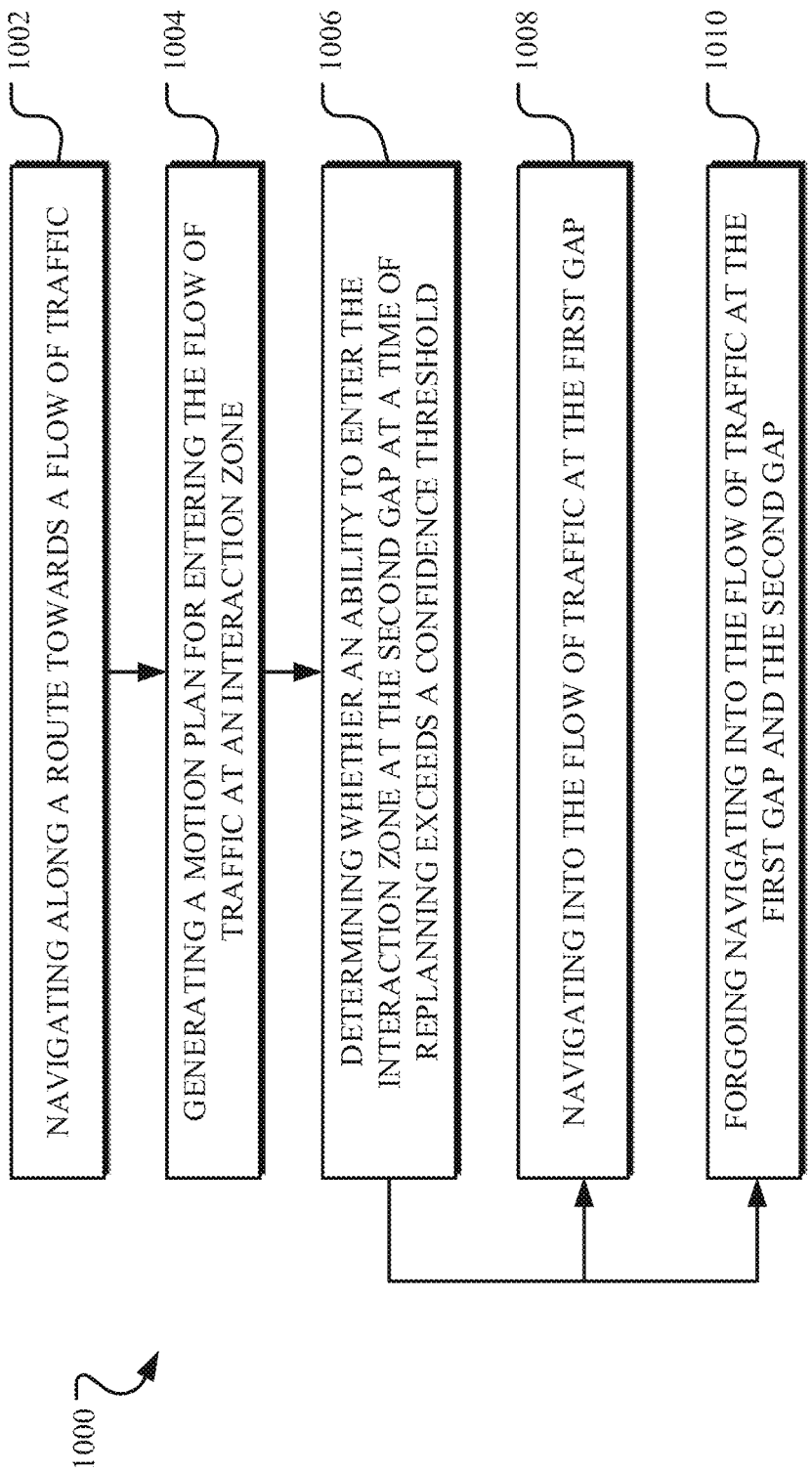
FIG. 13 illustrates example operations for controlling an autonomous vehicle.

Turning to FIG. 13, example operations 1000 for controlling an autonomous vehicle are shown. In one implementation, an operation 1002 navigates the autonomous vehicle along a route towards a flow of traffic. The flow of traffic includes a first vehicle followed by a second vehicle, the second vehicle followed by a third vehicle, a first gap between the first vehicle and the second vehicle, and a second gap between the second vehicle and the third vehicle.

An operation 1004 generates a motion plan for directing the autonomous vehicle into the flow of traffic at an interaction zone. In one implementation, the operation 1004 includes operations 1006-1010. Operation 1006 determines whether an ability of the autonomous vehicle to enter the interaction zone at the second gap exceeds a confidence threshold. Generally, the operation 1006 may perform the various hedging operations described herein to determine whether the ability of the autonomous vehicle to enter the interaction zone at the second gap exceeds the confidence threshold. In one implementation, the operation 1006 may estimate at least one of a time of arrival or a position of arrival of the second vehicle at the interaction zone. The operation 1006 may further estimate a size of the second gap at the time of arrival of the second vehicle at the interaction zone.

Alternatively or additionally, the operation 1006 may estimate a position of the autonomous vehicle relative to the second gap at the time of arrival of the second vehicle at the interaction zone based at least in part on a minimum velocity of the autonomous vehicle within constraints imposed by the third vehicle. The position of the autonomous vehicle relative to the second gap at the time of arrival of the second vehicle at the interaction zone may be further estimated based on a maximum negative acceleration threshold and a maximum positive acceleration threshold for the autonomous vehicle. The maximum negative acceleration threshold may be associated with a first phase of a velocity profile for the autonomous vehicle and the maximum positive acceleration threshold may be associated with a second phase of the velocity profile, with the velocity profile corresponding to the confidence threshold. In one implementation, the first phase switches to the second phase at a switch time. The switch time may be calculated based on an upper bound for acceleration of the autonomous vehicle, a lower bound for acceleration of the autonomous vehicle, an upper bound for jerk of the autonomous vehicle, a lower bound for jerk of the autonomous vehicle, a velocity of the autonomous vehicle at a time of planning, an acceleration of the autonomous vehicle at the time of planning, and/or the like.

The operation 1008 autonomously navigates the autonomous vehicle into the flow of traffic at the first gap when the ability of the autonomous vehicle to enter the interaction zone at the second gap at a time of replanning exceeds the confidence threshold. In one implementation, in accordance with autonomously navigating the autonomous vehicle into the flow of traffic at the first gap in connection with the operation 1008, an intent to enter the interaction zone at the first gap is communicated to the second vehicle using at least one of a display visible to the second vehicle or a behavior profile of the autonomous vehicle. An operation 1010 forgoes navigation of the autonomous vehicle into the flow of traffic at the first gap and the second gap when the ability of the autonomous vehicle to enter the interaction zone at the second gap does not exceed the confidence threshold.

In one implementation, the operation 1004 further includes determining whether an ability of the autonomous vehicle to enter the interaction zone at the first gap exceeds an initial confidence threshold. When the ability of the autonomous vehicle to enter the interaction zone at the first gap does not exceed the initial confidence threshold, the operation 1006 determines whether the ability of the autonomous vehicle to enter the interaction zone at the second gap exceeds the confidence threshold. When the ability of the autonomous vehicle to enter the interaction zone at the first gap exceeds the initial confidence threshold, the autonomous vehicle is navigated into the flow of traffic at the first gap automatically. The ability of the autonomous vehicle to enter the interaction zone at the first gap may exceed the initial confidence threshold, for example, where the interaction zone provides for a right of way to the autonomous vehicle over the second vehicle.

Figure 14:
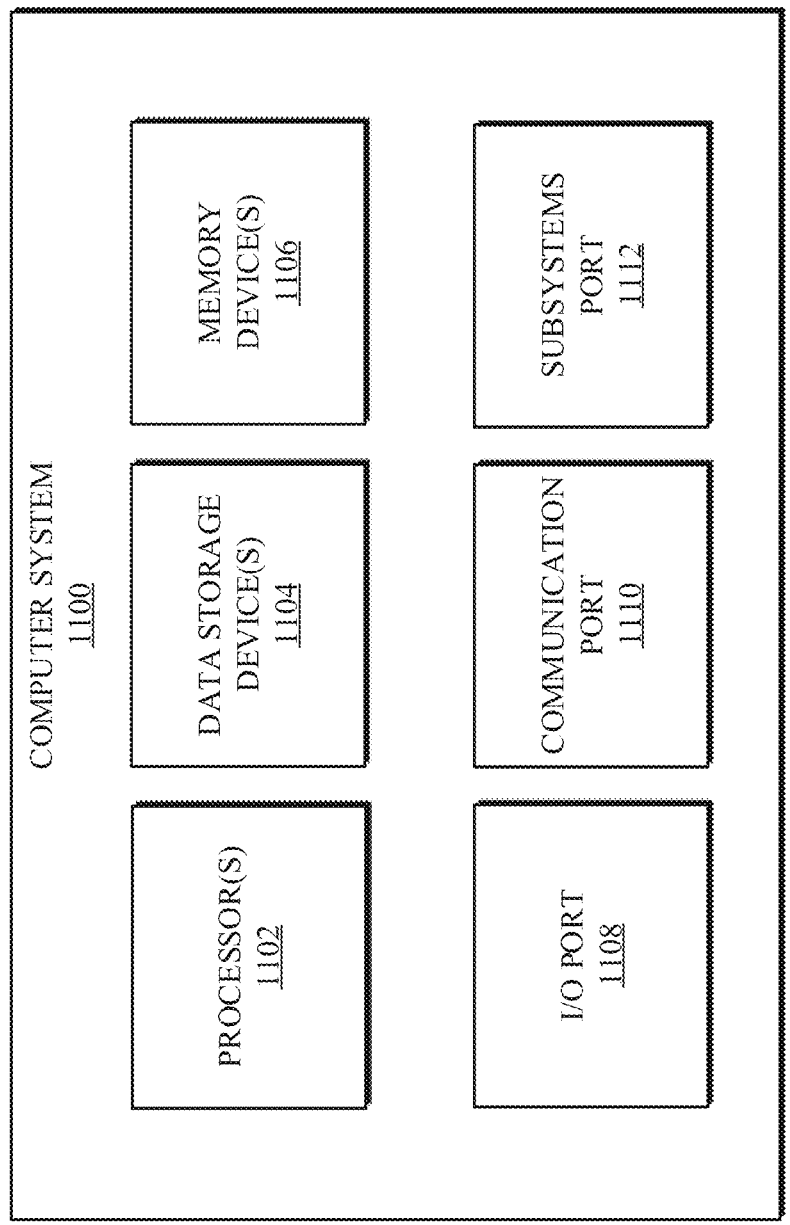
FIG. 14 shows an example computing system that may implement various aspects of the presently disclosed technology.

Referring to FIG. 14, a detailed description of an example computing system 1100 having one or more computing units that may implement various systems and methods discussed herein is provided. The computing system 1100 may be applicable to the measuring system 112 and other computing or network devices. It will be appreciated that specific implementations of these devices may be of differing possible specific computing architectures not all of which are specifically discussed herein but will be understood by those of ordinary skill in the art.

The computer system 1100 may be a computing system is capable of executing a computer program product to execute a computer process. Data and program files may be input to the computer system 1100, which reads the files and executes the programs therein. Some of the elements of the computer system 1100 are shown in FIG. 14, including one or more hardware processors 1102, one or more data storage devices 1104, one or more memory devices 1106, and/or one or more ports 1108-1112. Additionally, other elements that will be recognized by those skilled in the art may be included in the computing system 1100 but are not explicitly depicted in FIG. 11 or discussed further herein. Various elements of the computer system 1100 may communicate with one another by way of one or more communication buses, point-to-point communication paths, or other communication means not explicitly depicted in FIG. 11.

The processor 1102 may include, for example, a central processing unit (CPU), a microprocessor, a microcontroller, a digital signal processor (DSP), and/or one or more internal levels of cache. There may be one or more processors 1102, such that the processor 1102 comprises a single central-processing unit, or a plurality of processing units capable of executing instructions and performing operations in parallel with each other, commonly referred to as a parallel processing environment.

The computer system 1100 may be a conventional computer, a distributed computer, or any other type of computer, such as one or more external computers made available via a cloud computing architecture. The presently described technology is optionally implemented in software stored on the data stored device(s) 1104, stored on the memory device(s) 1106, and/or communicated via one or more of the ports 1108-1112, thereby transforming the computer system 1100 in FIG. 14 to a special purpose machine for implementing the operations described herein. Examples of the computer system 1100 include personal computers, terminals, workstations, mobile phones, tablets, laptops, personal computers, multimedia consoles, gaming consoles, set top boxes, and the like.

The one or more data storage devices 1104 may include any non-volatile data storage device capable of storing data generated or employed within the computing system 1100, such as computer executable instructions for performing a computer process, which may include instructions of both application programs and an operating system (OS) that manages the various components of the computing system 1100. The data storage devices 1104 may include, without limitation, magnetic disk drives, optical disk drives, solid state drives (SSDs), flash drives, and the like. The data storage devices 1104 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1106 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 1104 and/or the memory devices 1106, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 1100 includes one or more ports, such as an input/output (I/O) port 1108, a communication port 1110, and a sub-systems port 1112, for communicating with other computing, network, or vehicle devices. It will be appreciated that the ports 1108-1112 may be combined or separate and that more or fewer ports may be included in the computer system 1100.

The I/O port 1108 may be connected to an I/O device, or other device, by which information is input to or output from the computing system 1100. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 1100 via the I/O port 1108. Similarly, the output devices may convert electrical signals received from computing system 1100 via the I/O port 1108 into signals that may be sensed as output by a human, such as sound, light, and/or touch. The input device may be an alphanumeric input device, including alphanumeric and other keys for communicating information and/or command selections to the processor 1102 via the I/O port 1108. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 1100 via the I/O port 1108. For example, an electrical signal generated within the computing system 1100 may be converted to another type of signal, and/or vice-versa. In one implementation, the environment transducer devices sense characteristics or aspects of an environment local to or remote from the computing device 1100, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 1100, such as, physical movement of some object (e.g., a mechanical actuator), heating or cooling of a substance, adding a chemical substance, and/or the like.

In one implementation, a communication port 1110 is connected to a network by way of which the computer system 1100 may receive network data useful in executing the methods and systems set out herein as well as transmitting information and network configuration changes determined thereby. Stated differently, the communication port 1110 connects the computer system 1100 to one or more communication interface devices configured to transmit and/or receive information between the computing system 1100 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 1110 to communicate one or more other machines, either directly over a point-to-point communication path, over a wide area network (WAN) (e.g., the Internet), over a local area network (LAN), over a cellular (e.g., third generation (3G), fourth generation (4G) network, or fifth generation (9G)), network, or over another communication means. Further, the communication port 1110 may communicate with an antenna for electromagnetic signal transmission and/or reception. In some examples, an antenna may be employed to receive Global Positioning System (GPS) data to facilitate determination of a location of a machine, vehicle, or another device.

The computer system 1100 may include a sub-systems port 1112 for communicating with one or more systems related to a vehicle to control an operation of the vehicle and/or exchange information between the computer system 1100 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, traffic flow information, motion plans, velocity profiles, and software and other modules and services may be embodied by instructions stored on the data storage devices 1104 and/or the memory devices 1106 and executed by the processor 1102. The computer system 1100 may be integrated with or otherwise form part of a vehicle. In some instances, the computer system 1100 is a portable device that may be in communication and working in conjunction with various systems or sub-systems of a vehicle.

The present disclosure recognizes that the use of information discussed herein may be used to the benefit of users. For example, the motion planning information of a vehicle may be used to provide targeted information concerning a "best" path or route to the vehicle and to avoid surface hazards. Accordingly, use of such information enables calculated control of an autonomous vehicle. Further, other uses for motion planning information that benefit a user of the vehicle are also contemplated by the present disclosure.

Users can selectively block use of, or access to, personal data, such as location information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 14 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for controlling an autonomous vehicle, the method comprising:
   at one or more processors:
   navigating the autonomous vehicle along a route towards a flow of traffic, the flow of traffic including a first vehicle followed by a second vehicle, the second vehicle followed by a third vehicle, a first gap between the first vehicle and the second vehicle, and a second gap between the second vehicle and the third vehicle; and
   generating a motion plan for directing the autonomous vehicle into the flow of traffic at an interaction zone, generation of the motion plan comprising:
   determining whether an ability of the autonomous vehicle to enter the interaction zone at the second gap at a time of replanning exceeds a confidence threshold;
   autonomously navigating the autonomous vehicle into the flow of traffic at the first gap when the ability of the autonomous vehicle to enter the interaction zone at the second gap at the time of replanning exceeds the confidence threshold; and
   forgoing navigation of the autonomous vehicle into the flow of traffic at the first gap and the second gap when the ability of the autonomous vehicle to enter the interaction zone at the second gap at the time of replanning does not exceed the confidence threshold.

2. The method of claim 1, wherein generation of the motion plan further comprises:
   determining whether an ability of the autonomous vehicle to enter the interaction zone at the first gap exceeds an initial confidence threshold; and
   determining whether the ability of the autonomous vehicle to enter the interaction zone at the second gap at the time of replanning exceeds the confidence threshold when the ability of the autonomous vehicle to enter the interaction zone at the first gap does not exceed the initial confidence threshold.

3. The method of claim 1, wherein the autonomous vehicle is navigated into the flow of traffic at the first gap automatically in accordance with a determination that an ability of the autonomous vehicle to enter the interaction zone at the first gap exceeds an initial confidence threshold.

4. The method of claim 3, wherein the determination that the ability of the autonomous vehicle to enter the interaction zone at the first gap exceeds the initial confidence threshold comprises:
   determining whether the interaction zone provides for a right of way to the autonomous vehicle over the second vehicle.

5. The method of claim 1, wherein determining whether the ability of the autonomous vehicle to enter the interaction zone at the second gap at the time of replanning exceeds the confidence threshold comprises:
   estimating at least one of a time of arrival or a position of arrival of the second vehicle at the interaction zone.

6. The method of claim 5, wherein determining whether the ability of the autonomous vehicle to enter the interaction zone at the second gap at the time of replanning exceeds the confidence threshold further comprises:
   estimating a size of the second gap at the time of arrival of the second vehicle at the interaction zone.

7. The method of claim 5, wherein determining whether the ability of the autonomous vehicle to enter the interaction zone at the second gap at the time of replanning exceeds the confidence threshold further comprises:
estimating a position of the autonomous vehicle relative to the second gap at the time of arrival of the second vehicle at the interaction zone based at least in part on a minimum velocity of the autonomous vehicle within constraints imposed by the third vehicle.

8. The method of claim 7, wherein the position of the autonomous vehicle relative to the second gap at the time of arrival of the second vehicle at the interaction zone is further estimated based on a maximum negative acceleration threshold and a maximum positive acceleration threshold for the autonomous vehicle.

9. The method of claim 8, wherein the maximum negative acceleration threshold is associated with a first phase of a velocity profile for the autonomous vehicle and the maximum positive acceleration threshold is associated with a second phase of the velocity profile, the velocity profile corresponding to the confidence threshold.

10. The method of claim 9, wherein the first phase switches to the second phase at a switch time, the switch time calculated based on an upper bound for acceleration of the autonomous vehicle, a lower bound for acceleration of the autonomous vehicle, an upper bound for jerk of the autonomous vehicle, a lower bound for jerk of the autonomous vehicle, a velocity of the autonomous vehicle at a time of planning, and an acceleration of the autonomous vehicle at the time of planning.

11. The method of claim 1, further comprising:
in accordance with autonomously navigating the autonomous vehicle into the flow of traffic at the first gap, communicating an intent to enter the interaction zone at the first gap to the second vehicle using at least one of a display visible to the second vehicle or a behavior profile of the autonomous vehicle.

12. A system for controlling an autonomous vehicle, the system comprising:
a perception system detecting a first vehicle and a second vehicle in a flow of traffic, the second vehicle following the first vehicle with a first gap between the first vehicle and the second vehicle and a second gap following the second vehicle, the flow of traffic having an interaction zone towards which the autonomous vehicle is navigating;
a motion controller having at least one processing unit in communication with the perception system, the motion controller generating a motion plan for directing the autonomous vehicle into the flow of traffic at the interaction zone, the motion plan generated based on a determination of whether an ability of the autonomous vehicle to enter the interaction zone at the second gap at a time of replanning exceeds a confidence threshold; and
one or more vehicle subsystems in communication with the motion controller, the one or more vehicle subsystems autonomously navigating the autonomous vehicle into the flow of traffic at the first gap when the ability of the autonomous vehicle to enter the interaction zone at the second gap at the time of replanning exceeds the confidence threshold and forgoing navigation of the autonomous vehicle into the flow of traffic at the first gap and the second gap when the ability of the autonomous vehicle to enter the interaction zone at the second gap at the time of replanning does not exceed the confidence threshold.

13. The system of claim 12, the motion plan is further generated based on an initial determination of whether an ability of the autonomous vehicle to enter the interaction zone at the first gap exceeds an initial confidence threshold, the determination of whether the ability of the autonomous vehicle to enter the interaction zone at the second gap at the time of replanning exceeds the confidence threshold being generated when the ability of the autonomous vehicle to enter the interaction zone at the first gap does not exceed the initial confidence threshold.

14. The system of claim 12, wherein the one or more vehicle subsystems autonomously navigate the autonomous vehicle into the flow of traffic at the first gap automatically in accordance with an initial determination that an ability of the autonomous vehicle to enter the interaction zone at the first gap exceeds an initial confidence threshold.

15. The system of claim 14, wherein the initial determination that the ability of the autonomous vehicle to enter the interaction zone at the first gap exceeds the initial confidence threshold comprises:
determining whether the interaction zone provides for a right of way to the autonomous vehicle over the second vehicle.

16. The system of claim 12, wherein the determination of whether the ability of the autonomous vehicle to enter the interaction zone at the second gap at the time of replanning exceeds the confidence threshold comprises:
estimating at least one of a time of arrival or a position of arrival of the second vehicle at the interaction zone.

17. The system of claim 16, wherein the determination of whether the ability of the autonomous vehicle to enter the interaction zone at the second gap at the time of replanning exceeds the confidence threshold further comprises:
estimating a position of the autonomous vehicle relative to the second gap at the time of arrival of the second vehicle at the interaction zone based at least in part on a minimum velocity of the autonomous vehicle within constraints imposed by a third vehicle, the second gap between the second vehicle and the third vehicle.

18. The system of claim 17, wherein the position of the autonomous vehicle relative to the second gap at the time of arrival of the second vehicle at the interaction zone is further estimated based on a maximum negative acceleration threshold and a maximum positive acceleration threshold for the autonomous vehicle.

19. The system of claim 18, wherein the maximum negative acceleration threshold is associated with a first phase of a velocity profile for the autonomous vehicle and the maximum positive acceleration threshold is associated with a second phase of the velocity profile, the velocity profile corresponding to the confidence threshold, wherein the first phase switches to the second phase at a switch time, the switch time calculated based on an upper bound for acceleration of the autonomous vehicle, a lower bound for acceleration of the autonomous vehicle, an upper bound for jerk of the autonomous vehicle, a lower bound for jerk of the autonomous vehicle, a velocity of the autonomous vehicle at a time of planning, and an acceleration of the autonomous vehicle at the time of planning.

20. The system of claim 12, further comprising:
a display connected to the autonomous vehicle and visible to the second vehicle, the display communicating an intent to enter the interaction zone at the first gap to the second vehicle.

21. One or more tangible non-transitory computer-readable storage media storing computer-executable instructions for performing a computer process on a computing system, the computer process comprising:

receiving traffic flow data for a flow of traffic towards which an autonomous vehicle is navigating, the flow of traffic including a first vehicle followed by a second vehicle with a first gap between the first vehicle and the second vehicle and a second gap following the second vehicle;

identifying an uncertainty in whether the second vehicle will yield to the autonomous vehicle at an interaction zone;

generating a motion plan for directing the autonomous vehicle into the flow of traffic at the interaction zone, the motion plan generated based on a determination of whether an ability of the autonomous vehicle to enter the interaction zone at the second gap at the time of replanning exceeds a confidence threshold; and generating vehicle subsystem data based on the motion plan, the vehicle subsystem data being communicated to at least one vehicle subsystem for autonomously navigating the autonomous vehicle into the flow of traffic at the first gap when the ability of the autonomous vehicle to enter the interaction zone at the second gap at the time of replanning exceeds the confidence threshold and forgoing navigation of the autonomous vehicle into the flow of traffic at the first gap and the second gap when the ability of the autonomous vehicle to enter the interaction zone at the second gap at the time of replanning does not exceed the confidence threshold.

\* \* \* \* \*